US010677636B2

(12) United States Patent
Weindl

(10) Patent No.: US 10,677,636 B2
(45) Date of Patent: Jun. 9, 2020

(54) METHOD FOR CALIBRATING FLOW METERS FOR FLUID MEDIA

(71) Applicant: Robert Bosch GmbH, Stuttgart (DE)

(72) Inventor: Karl Weindl, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 741 days.

(21) Appl. No.: 15/315,487

(22) PCT Filed: Apr. 14, 2015

(86) PCT No.: PCT/EP2015/058088
§ 371 (c)(1),
(2) Date: Dec. 1, 2016

(87) PCT Pub. No.: WO2015/185254
PCT Pub. Date: Dec. 10, 2015

(65) Prior Publication Data
US 2018/0188101 A1 Jul. 5, 2018

(30) Foreign Application Priority Data
Jun. 4, 2014 (DE) .................. 10 2014 210 545

(51) Int. Cl.
*G01F 25/00* (2006.01)
(52) U.S. Cl.
CPC ........ *G01F 25/003* (2013.01); *G01F 25/0046* (2013.01)
(58) Field of Classification Search
None
See application file for complete search history.

(56) References Cited

U.S. PATENT DOCUMENTS

| 4,107,984 A | 8/1978 | Unger et al. |
| 4,253,156 A | 2/1981 | Lisle et al. |
| (Continued) | | |

FOREIGN PATENT DOCUMENTS

| DE | 102008008427 | 11/2009 |
| JP | 2001165755 A * | 6/2001 |
| (Continued) | | |

OTHER PUBLICATIONS

JP 2001165755 A translation (Year: 2001).*
(Continued)

*Primary Examiner* — Lina M Cordero
(74) *Attorney, Agent, or Firm* — Michael Best & Friedrich LLP

(57) ABSTRACT

A method for calibrating flow meters for fluid media comprises the steps of guiding a medium (102) through a reference measuring section (101-1) and a test measuring section (101-2) which has a flow meter to be calibrated, establishing at least approximately identical and constant pressure and flow conditions for the medium (102) in both measuring sections (101-1, 101-2), detecting a reference throughflow of the medium (102) through the reference measuring section (101-1) and throughflow values which correspond temporally thereto and are measured by the flow meter (125) to be calibrated of the test measuring section at a preset medium temperature, comparing the detected reference throughflow through the reference measuring section (101-1) with the throughflow values which correspond temporally thereto of the flow meter (125) to be calibrated, in order, based on this, to determine at least one correction value for the calibration of the flow meter (125) at the preset medium temperature, and determining of the respective correction value for the flow meter (125) for different medium temperatures of the medium (102), in order to (Continued)

determine a calibrating function using the temperature-dependent correction values as grid points.

21 Claims, 9 Drawing Sheets

(56) References Cited

U.S. PATENT DOCUMENTS

| | | | |
|---|---|---|---|
| 4,307,601 A * | 12/1981 | Jackson | G01F 25/0015 |
| | | | 73/1.22 |
| 4,566,307 A * | 1/1986 | Boykin | G01F 25/003 |
| | | | 73/1.28 |
| 4,823,592 A * | 4/1989 | Hahn | G01F 1/84 |
| | | | 73/1.33 |
| 4,879,662 A * | 11/1989 | Vicari | G01F 1/26 |
| | | | 700/282 |
| 5,072,416 A | 12/1991 | Francisco et al. | |
| 5,335,552 A * | 8/1994 | Hylton | G01F 1/76 |
| | | | 73/861 |
| 5,944,048 A * | 8/1999 | Bump | G01F 1/6842 |
| | | | 137/486 |
| 6,453,721 B1 | 9/2002 | Grzeslo et al. | |
| 7,934,413 B2 * | 5/2011 | Winchester | G01F 25/003 |
| | | | 73/1.21 |
| 2003/0225538 A1 | 12/2003 | Baker et al. | |
| 2004/0216509 A1 * | 11/2004 | Antonijevic | G01F 1/8472 |
| | | | 73/1.16 |
| 2007/0028663 A1 | 2/2007 | Patten et al. | |
| 2007/0043976 A1 * | 2/2007 | Cunningham | G01F 1/84 |
| | | | 714/27 |
| 2007/0112536 A1 | 5/2007 | Artiuch et al. | |
| 2011/0239730 A1 * | 10/2011 | van Brakel | G01F 25/0007 |
| | | | 73/1.82 |

FOREIGN PATENT DOCUMENTS

| | | |
|---|---|---|
| WO | 02097379 | 12/2002 |
| WO | 2013056235 | 4/2013 |

OTHER PUBLICATIONS

International Search Report for Application No. PCT/EP2015/058088 dated Jul. 3, 2015 (English Translation, 3 pages).
Weager, "Namas-Approved Flowmetering," Measurement and Control, Institute of Measurement and Control, London, GB, vol. 26, No. 10, Dec. 1, 1993, pp. 298-301.
Boucher et al., Low Reynolds number fluidic flowmetering,, Journal of Physics E. Scientific Instruments, IOP Publishing, Bristol, GB, vol. 21, No. 10, Oct. 1, 1988, pp. 977-989.

* cited by examiner

METHOD FOR CALIBRATING FLOW METERS FOR FLUID MEDIA

BACKGROUND OF THE INVENTION

The invention relates to a method for calibrating flow meters for fluid media and a calibration device, which is suitable in particular for carrying out such a method.

Flow meters are used for determining the flow rate of a fluid medium, for example, diesel oil, and are typically adjusted and/or calibrated by means of a defined volume stream. Nevertheless, measurement errors and/or measurement uncertainties result in the conventional calibration methods, which are substantially to be attributed to the fact that physical effects of different types, which occur at higher temperatures, are not taken into consideration. Thus, upon heating of the fluid medium, increasing measured value scattering occurs in such a flow meter due to the mixing of gas bubbles and fluid then resulting as a consequence of the heating and the rising system pressure accompanying this, wherein the viscosity of the fluid medium decreases with rising fluid temperature, which results in a successively decreasing friction resistance of the fluid medium on surfaces of mechanically moving components of such a flow meter. In particular at higher temperatures, such flow meters are thus no longer reliably usable, because the required tolerances are exceeded as a result of systematic drifting of the flow measured values of the flow meter. Such measurement deviations are not detectable using conventional calibration methods, however, because the applicable calibration standard guidelines for carrying out calibrations only prescribe a calibration temperature of 40° C.

SUMMARY OF THE INVENTION

The method according to the invention has the advantage that flow meters can be calibrated with high accuracy over a broad temperature range of fluid media. For this purpose, the method comprises the steps of conducting a fluid medium through a reference measurement section and a test measurement section, having a flow meter to be calibrated, setting at least approximately identical and constant pressure and flow conditions for the fluid medium in both measurement sections, detecting a reference flow of the fluid medium through the reference measurement section and flow values corresponding chronologically thereto, which are measured by the flow meter to be calibrated of the test measurement section at a preset temperature, comparing the detected reference flow through the reference measurement section to the flow values chronologically corresponding thereto of the flow meter to be calibrated, to ascertain at least one correction value for the calibration of the flow meter at the preset temperature based thereon, and determining the respective correction value for the flow meter for different temperatures of the fluid medium, to ascertain a calibration function on the basis of the temperature-dependent correction values as support points.

One embodiment of the method according to the invention can be that the fluid medium is heated to the preset temperature before it enters the test measurement section, wherein the temperature is kept constant during a running measurement series within the test measurement section. A reference flow meter, through which a fluid medium flows in the "cold" state, can thus be compared to a flow meter to be calibrated in the test measurement section, through which the fluid medium flows in the "hot" state. This is advantageous in particular if a use and/or operation with changing media temperatures is planned for the flow meter to be calibrated and therefore the temperature usage range is to be determined.

Another embodiment of the method according to the invention can be that the fluid medium is heated to the predetermined temperature before it enters the reference measurement section, wherein the media temperature is kept constant during a running measurement series within the reference measurement section and test measurement section. During this so-called "hot calibration", the medium which is warmed or heated to a predetermined temperature flows through both the reference measurement section and also the test measurement section, so that a reference flow meter is compared to a flow meter to be calibrated under isothermal conditions, i.e., at equal media temperature in both measurement sections.

A particularly advantageous method variant, using which a high-precision calibration can be achieved, provides that to detect a total flow rate, a volume of the fluid medium which flows through the reference measurement section and the test measurement section during a measurement procedure or a measurement series is determined by weighing.

According to one method variant, the correction value for a predetermined media temperature T at a predefined viscosity of the medium is ascertained on the basis of the following equation: $k_T = Q_{setpoint} - Q$, wherein $Q_{setpoint}$ denotes a setpoint flow rate and Q denotes the mean value of multiple flow rate measured values detected in chronological succession by means of the flow meter to be calibrated.

According to another method variant, which is used if the medium to flow through the measurement sections during a measurement procedure or a measurement series is additionally weighed, a significantly more precise correction value may be achieved on the basis of the additional weighing, which is ascertained for a predetermined media temperature T on the basis of the following equation: $k_T = Q_{setpoint} - Q_{master} - Q_{weighed} + Q_{cal}$, wherein $Q_{setpoint}$ denotes the flow volume to be measured, $Q_{master}$ denotes the respective mean value of the flow volume ascertained in the reference measurement section, $Q_{weighed}$ denotes the respective mean value of the flow volume measured by weighing, $Q_{cal}$ denotes the mean flow volume in the test measurement section, and $k_T$ denotes the correction value during a flow of a predetermined flow volume.

A measurement uncertainty for the flow meter to be calibrated can be ascertained with reference to the following equation on the basis of the ascertained correction value $k_T$:

$$\pm u = 0.5 * \sqrt{k_T^2 + \Sigma_{j=1}^{l} c_j^2}$$

wherein ±u denotes the measurement uncertainty and $k_T$ denotes the correction value at a predetermined media temperature T, while systematic measurement deviations of different origins are denoted by the variables $c_j$, for example, in order to take into consideration, by means of one of the variables, the comparison point difference resulting upon comparison of measurements in the reference measurement section and the test measurement section or by means of another variable to take into consideration metrological scattering, for example, as a result of pressure variations or control oscillations. In this case, j denotes the running index in the summation of the individual variables and 1 denotes the number of the variables to be considered.

In a device aspect, the calibration device has a reference measurement section and a test measurement section for a flow meter to be calibrated, wherein means for detecting pressure, temperature, and viscosity of the fluid medium and means for determining at least one correction value and/or one calibration function on the basis of at least one flow measured value in the reference measurement section and flow measured values detected in a manner chronologically corresponding thereto by the flow meter to be calibrated are provided. The latter means can be designed, for example, as a computer unit having a memory implemented therein, to efficiently execute the required calculations, the access to the measurement data stored in the memory, and the storage of processed data in the memory.

To be able to carry out a hot calibration of a flow meter in the test measurement section, means for heating the fluid medium are arranged in the flow direction between the reference measurement section and the downstream test measurement section, which have at least one heat exchanger and an associated temperature control device.

A particularly advantageous refinement of the invention, using which extraordinarily precise calibration is achievable, can be that means for weighing the flow rate which flows through the reference measurement section and the test measurement section during a measurement series are downstream of the test measurement section in the flow direction of the fluid medium. In this case, the means for weighing comprise a weighing container for accommodating the medium exiting from the test measurement section, wherein the weighing container can be fluidically coupled via at least one line to an outlet of the test measurement section and the weighing container has at least one weighing measurement cell, which is used for weighing the medium accommodated in the weighing container. To be able to intentionally couple the flow branch into the flow path or decouple it from the flow path as needed, at least one switching valve is provided, which is downstream of the outlet of the test measurement section on the outflow side, to conduct the medium exiting from the test measurement section into the weighing container in a first valve switch position and to instead return the medium into a storage tank in a second valve switch position. Control means are provided for controlling the at least one switching valve, the function of which can advantageously be exerted by the above-mentioned computer unit.

According to one expedient embodiment of the invention, sensors are arranged in each case in the reference measurement section and the test measurement section, to detect physical measured variables of the fluid medium at least on the basis of pressure, temperature, and viscosity. Using the sensors, pressure, temperature, and viscosity of the medium are continuously monitored in the two measurement sections, to produce and/or adjust stable boundary conditions as a prerequisite for the calibration. By providing at least one viscosity sensor, it is possible to calibrate or recalibrate a flow meter for fluid media of different viscosities or to detect a change of the viscosity of the medium flowing through the measurement section(s) at various media temperatures.

A particularly advantageous refinement of the invention can be that at least one flow rectifier is provided in each case both in the reference measurement section and also in the test measurement section, to produce substantially laminar, i.e., low-turbulence flow conditions in the two measurement sections. The medium pumped through the measurement sections then returns into the storage tank either directly or via detours, for example, via the weighing container.

In order that the calibration device can operate as a closed circuit system, a storage tank for accommodating the fluid medium and at least one pump are provided, which conveys the fluid medium during the calibration operation through the reference measurement section and the test measurement section, which is downstream in the flow direction. The medium flowing through the two measurement sections can then return to the storage tank either directly or via detours, for example, via the weighing container.

A particularly accurate reference setpoint specification of the flow rate may be achieved by arranging at least two flow meters in succession in the flow direction in the reference measurement section.

An altered embodiment of the calibration device, in which the two flow meters in the reference measurement section can be omitted and nonetheless a high precision of the setpoint specification of the flow rate is achievable, can be that the reference measurement section has an operating piston, which is accommodated so it is displaceable in a cylinder, and which is used to generate a constant, uniform volume stream of the fluid medium in the reference measurement section during execution of its operating stroke. Pressure pulsations, which can be caused by a pump, for example, can thus advantageously be compensated for during the duration of an operating stroke of the operating piston.

To be able to exchange or replace a flow meter rapidly for calibration, without having to empty or entirely deactivate the calibration device, an advantageous refinement of the calibration device according to the invention can be that at least one switching valve is arranged between reference measurement section and test measurement section, which fluidically connects the reference measurement section to the test measurement section in a first valve switch position and fluidically disconnects the test measurement section from the reference measurement section in a second valve switch position. It is thus possible to conduct the fluid medium via another flow path, which is used as a bypass line, instead of via the test measurement section during a replacement procedure. Control means, the function of which can advantageously be exerted by the above-mentioned computer unit, are used to control the at least one switching valve.

An embodiment of the calibration device which can be used in a mobile manner is that the reference measurement section is designed as a mobile module, which is provided with a calibration on the basis of at least one calibration data set, wherein the at least one calibration data set provides at least one correction factor for the reference function of the module. The module is typically calibrated as part of a stationary calibration device, within which the module initially forms the test measurement section, by means of the reference measurement section of the stationary calibration device, to be used after this calibration in the new function thereof as a reference, which can be used in a mobile manner, for a flow meter or test subject to be calibrated. In addition, the module functionally interacts with the at least one calibration data set assigned thereto and is thus usable in flexible positions.

BRIEF DESCRIPTION OF THE DRAWINGS

Exemplary embodiments of the invention are explained in greater detail in the following description and in the appended drawings. In the schematic figures of the latter.

DETAILED DESCRIPTION

Figure 1:
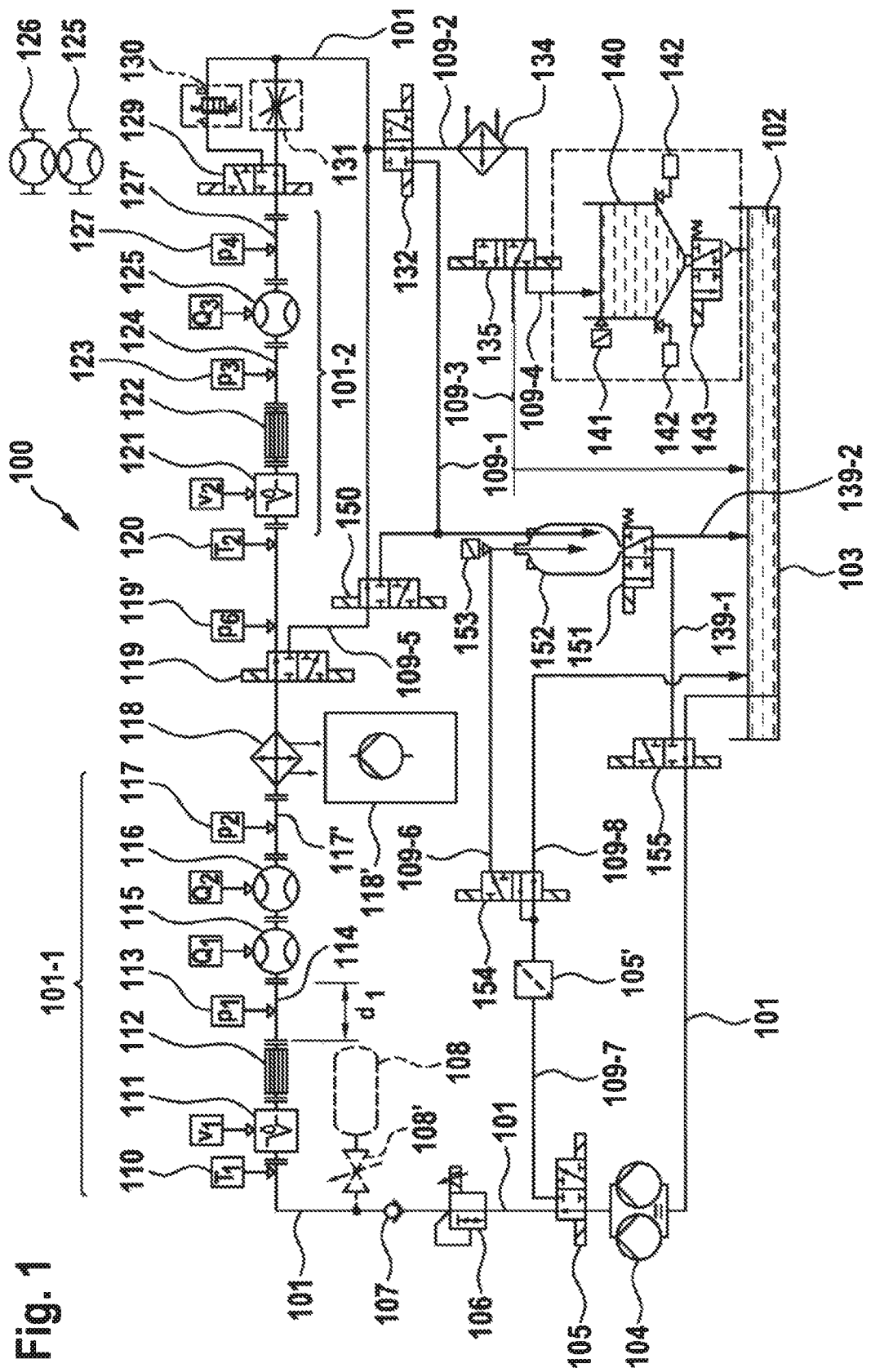
FIG. 1 shows a calibration device according to a first embodiment.

FIG. 1 shows a schematic view of a first embodiment of a calibration device 100, which is used for calibrating a flow meter 125 and is suitable for stationary measurement and calibration operation. In this case, a fluid medium 102 such as diesel oil, which is stored in a storage tank 103, preferably at room temperature, is used for the calibration of the corresponding flow meter or through-flow meter 125. The device 100 operates in a closed circuit, in which the storage tank 103 functions as the starting point and end point for the fluid medium 102 flowing through a main line 101 of the device 100. A pump 104, which is preferably designed as a dual pump, pumps the medium 102 via a line 101 out of the storage tank 103 and guides the medium 102 in a pressure-stabilized manner to a reference measurement section 101-1 of the line 101. For this purpose, a circulation valve 105, a throttle valve 106, and a check valve 107 are downstream in succession in the line 101 from the pump 104. A throttle 108' having attached membrane 108 is coupled to the part of the line 101 leading away from the check valve 107 on the outflow side for pulse regulation of the flow. After passing the three valves 105, 106, 107, the medium 102 flows past the throttle 108' having attached membrane 108 and into a line section 101-1, which is used as a reference measurement section and in which a temperature measurement point 110 for detecting the temperature of the inflowing medium 102, a viscosity sensor 111, a flow rectifier 112, a pressure measurement point 113, a first flow measurement point 115, a second flow measurement point 116, and an output pressure measurement point 117 are arranged in succession. The pressure sensor 113 is arranged in an inflow section 114, which extends between the flow rectifier 112 and the first flow measurement point 115 and has a length $d_1$, which is at least 200 mm. The second pressure sensor 117 is arranged in an outflow section 117', which is fluidically connected on the outflow side to the second flow measurement point 116. The flow rectifier 112 is provided for the purpose of substantially avoiding turbulent flow. In the reference measurement section 101-1, the viscosity of the fluid medium 102 is determined before the flow meter 115, which functions as a reference meter 115, and the temperature and entry pressure thereof are measured by means of the temperature measurement point 110 and the pressure sensor 113. The second flow meter 116 is provided for linearization of the flow measured values obtained in the reference measurement section 101-1.

After passing through the reference measurement section 101-1, the medium 102 flows through a heat exchanger 118, which is used in cooperation with a temperature control device 118' for the purpose of heating the fluid medium 102 to a predetermined temperature. The medium 102 then arrives via an idle valve 119 in a line section 101-2, which is used as the test measurement section. The test measurement section 101-2 is constructed substantially similarly to the reference measurement section 101-1. A temperature measurement point 120 for detecting the intake temperature of the inflowing medium 102, a viscosity sensor 121, a flow rectifier 122, a pressure measurement point 123, a flow meter or test subject 125 to be calibrated, and an output pressure measurement point 127 are arranged in succession in the flow direction in the test measurement section 101-2. In this case, the pressure measurement point 123 is arranged in an inflow section 124, which extends between the flow rectifier 122 and the flow meter 125 to be calibrated. The output pressure measurement point 127 is arranged in a drain section 127', which is connected on the outflow side to the flow meter 125 to be calibrated. The flow rectifier 122 is used for the purpose of substantially avoiding a turbulent flow in the test measurement section 101-2. The medium 102 then arrives at a switching valve 129, which is downstream of the drain section 127' and is designed as a 4/2-multiport valve and, in a first valve switch position or idle position, fluidically connects the drain section 127' to a throttle valve 131 used for setting a constant pressure, while in contrast, in a second valve switch position, it fluidically connects the drain section 127' to a proportional throttle valve 130, which is used for setting a variable pressure. In this case, the outlets of the two throttle valves 130, 131 are fluidically connected to one another and are jointly guided via the line 101 to a switching valve 132. Because the switching valve 129 is located in its idle position, the medium 102 coming out of the test measurement section 101-2 flows through the throttle valve 131, which keeps the pressure constant at this point, and arrives at the switching valve 132. In its first valve switch position, the switching valve 132 lets through the medium 102, which comes from the test measurement section 101-2, depending on the switch position of the circulation valve 129, via one of the two throttle valves 130, 131 arranged in parallel to one another, to a heat exchanger 134, which is fluidically connected on the inflow side to the valve 132 via a line 109-2 and on the outflow side to a valve 135. The valve 135, in its first switch position, lets through the medium 102 cooled down by the heat exchanger 134 and; via a line 109-3, it returns into the storage tank 103. In its second switch position, the switching valve 135 connects the part of the line 109-2, which leads away on the outflow side from the heat exchanger 134, to a line 109-4, which leads into a weighing container 140 having a fill level meter 141 and two weighing cells 142, so that the medium 102 flowing into the weighing container 140 is measurable by means of the fill level meter 141 and the two weighing cells 142. A switching valve 143 arranged between outlet of the weighing container 140 and the storage tank 103 blocks the outlet of the weighing container 140 in a blocking position or releases the outlet of the weighing container 140 to the intake of the storage tank 103 in a passage position. In a second switch position of the switching valve 132, the line 109-2 to the weighing container 140 is blocked and a line 109-1, which leads to an intake of the circulation container 152, is released, so that the medium 102, which arrives from the test measurement section 101-2 via one of the throttle valves 130 or 131 and subsequently exits through the switching valve 132, arrives in the circulation container 152 via the line 109-1. A switching valve 151, which is connected on the outflow side to the outlet of the circulation container 152, connects, in its first switch position, the outlet of the circulation container 152 to a line 139-2 leading into the storage tank 103, so that the medium 102 collected in the circulation container 152 can drain into the storage tank 103. In the second switch position of the switching valve 151, the line 139-2 is blocked and the outlet of the circulation container 152 is connected to a line 139-1, which leads to a switching valve 155. In a first switch position of the switching valve 155, the pump 104 is connected via the line 101 to the storage tank 103, so that the pump 104 can suction the medium 102 out of the storage tank 103; in contrast, in the second switch position of the switching valve 155, the line section 139-1 is connected to the part of the line 101 leading to the pump 104 and therefore the pump 104, instead of conveying the medium 102 out of the storage tank 103, can suction the medium coming from the circulation container 152 and pump it further to the reference measurement section 101-1 and test measurement section 101-2; this switching configuration of the device 100 is selected for safety reasons in particular if the device 100 is operated at higher temperatures, for example, at 120° C. and greater, and the circulation container 152 is required as a closed tank for the medium 102 for this purpose.

The circulation container 152 has a second intake, which is provided with a fill level meter 153; via the second intake, the circulation container 152 can also be filled or refilled with the medium 102 from the storage tank 103 without interconnecting the reference measurement section 101-1 and test measurement section 101-2. For this purpose, the switching valve 105, which is downstream of the pump 104 in the line 101, and which releases the line 101 to the throttle valve 106 in the direction of the reference measurement section 101-1 in its first valve switch position, is switched over into its second valve switch position, in which the line 101 to the throttle valve 106 and therefore to the reference measurement section 101-1 and test measurement section 101-2 is blocked, wherein simultaneously a line section 109-7 is opened, which leads via a filter unit 105' to the switching valve 154. In its first valve switch position, the switching valve 154 connects the line section 109-7 to a line section 109-8, which leads directly into the storage tank 103, so that the medium 102 suctioned by the pump 104 from the storage tank 103 can flow in filtered form back into the storage tank 103, while in contrast, in its second valve switch position, it connects the line section 109-7 to a line section 109-6, which leads to the second intake of the circulation container 152 and therefore the medium 102 suctioned by the pump 104 out of the storage tank 103 can arrive in filtered form in the circulation container 152. In this case, the filling or refilling of the circulation container 152 is monitored by means of the fill level meter 153.

To exchange or replace a flow meter 125 to be calibrated, the switching valve 119, which is arranged between reference measurement section 101-1 and test measurement section 101-2, is switched out of its first valve switch position, i.e., its starting position, in which the reference measurement section 101-1 is fluidically coupled to the test measurement section 101-2, into its second valve switch position, in which the test measurement section 101-2 is fluidically disconnected from the reference measurement section 101-1, so that the test measurement section 101-2 does not run empty during such a change from the test subject 125 to another test subject 126 and penetration of air into the test measurement section 101-2 can be avoided. For this purpose, the switching valve 119 on the one hand, blocks, in its second valve switch position, the part of the line 101 leading to the test measurement section 101-2, and, on the other hand, connects the end on the outflow side of the heat exchanger 118, which is downstream of the reference measurement section 101-1, to a line section 109-5, which leads to the switching valve 150, which—in cooperation with the switching valve 119—is switched over into its second valve switch position and at the same time connects through the line section 109-5 to an intake of the circulation container 152, so that the medium flowing out of the reference measurement section 101-1 can drain off during an exchange or replacement procedure into the circulation container 152.

The switching valves 105, 119, 129, 132, 135, 143, 151, 154, and 155 of the calibration device 100 shown in FIG. 1 are designed as 4/2-multiport valves and are electrically operationally connected to a control unit (not shown in FIG. 1), which controls the switching valves and the cooperation thereof and furthermore the throttle valves on the basis of measurement signals, which are transmitted from the measurement points 110, 111, 113, 117, 119', 120, 121, 123, 127, 141, 142, and 153 to the control unit. Furthermore, the control unit receives and processes flow rate values which are detected and transmitted by the flow meters 115, 116, and 125.

In a method aspect, to calibrate a flow meter or test subject 125 in the test measurement section 101-2, the fluid medium 102 is taken from the storage tank 103 by means of the pump 104 and supplied in a pressure-stabilized manner to the reference measurement section 101-1, wherein the circulation container 152 is additionally filled. The switching valve 132 is subsequently closed. In the reference measurement section 101-1, the temperature $T_1$ is measured by means of the measurement point 110, and the pressure $p_1$ is measured by means of the pressure measurement point 113 before the flow meter 115, which functions as a reference, and also the viscosity of the medium 102 is determined at the measured temperature $T_1$ by means of the viscometer 111. After heating of the fluid medium 102 by means of the heat exchanger 118 and the temperature control device 118', in the test measurement section 101-2, the temperature $T_2$ is measured by means of the measurement point 120, the viscosity of the medium 102 at the measured temperature $T_2$ is determined by means of the viscometer 121, and the pressure at the flow meter or test subject 125 to be calibrated is regulated by means of the proportional throttle valve 130 so that the pressure $p_3$, which is detected by means of the pressure measurement point 123, before the flow meter 125 corresponds to the pressure $p_4$, which is detected by means of the pressure measurement point 127, until stable pressure conditions result between the reference measurement section and the test measurement section 101-2. These stable pressure conditions are present when the pressure $p_6$, which is detected by means of the pressure measurement point 119' arranged between reference measurement section and test measurement section, corresponds to the pressure $p_1$, which is detected by means of the pressure measurement point 113, which is arranged in the reference measurement section 101-1 before the flow meter 115 operating as the standard. Thus, if $p_3 \approx p_4$ and $p_6 \approx p_1$, stable pressure conditions are thus present and the data detection can be started for the calibration of the flow meter 125.

To carry out an optionally provided weighing procedure thereafter, according to a predetermined measurement cycle, the switching valve 132 is opened and the switching valve 135, which is provided for activating a weighing procedure, is switched so that the medium 102, which comes out of the test measurement section 101-2 and is thereupon cooled down by means of the heat exchanger 134, reaches the weighing container 140 in a time-controlled manner. The switching valve 135 provided for activating the weighing procedure is closed thereafter and the circulation container 152 is refilled if needed by means of the switching valve 154. After a predetermined relaxation time, the filling quantity of the weighing container 140 is measured by means of the weighing cells 142 and the fill level meter 141 and stored in a calibration table.

Table 1 below shows an example of a measurement series, which is used for calibrating a test subject 125, for a standard flow rate value, which is determined as a setpoint, of 160.0 L/hour at a temperature T≈90° C. In this case, flow rate values $Q_{master}$ detected by the flow meter 115 and the simultaneous temperature measured values $T_{master}$ in ° C. corresponding thereto at the temperature measurement point 110 and pressure measured values $p_1$ in bar at the pressure measurement point 113 for the reference measurement section 101-1 are listed in the first three columns of Table 1, while the flow rate values $Q_{(1)}$, $Q_{(2)}$, $Q_{(3)}$, and $Q_{(1cor)}$, $Q_{(2cor)}$, $Q_{(3cor)}$, which are associated with a respective flow rate value $Q_{master}$, are shown opposite in the remaining columns, which are measured in the test measurement section 101-2 at the test subject 125 to be calibrated. The measured values $Q_{(1)}$, $Q_{(2)}$, and $Q_{(3)}$ detected by the flow meter or test subject 125 are measured in rapid succession within a chronological measurement window, to take into consideration fluctuations and/or variations within the preset measurement window. To additionally eliminate systematic measurement errors, for example, metrological artifacts in the measured values detected by the test subject 125, which are outside a predefined tolerance range of ±1.5% with respect to the standard flow rate value of 160.0 L/hour, for each measured value $Q_{(1)}$, $Q_{(2)}$, and $Q_{(3)}$, associated correction measured values $Q_{(1cor)}$, $Q_{(2cor)}$, $Q_{(3cor)}$ are ascertained, in that values located outside the tolerance range remain unconsidered. A respective mean value is formed from the respective measured values for $Q_{master}$, $T_{master}$, p, and $Q_{(1cor)}$, $Q_{(2cor)}$, $Q_{(3cor)}$, wherein a single mean value Q is formed from the mean values for $Q_{(1cor)}$, $Q_{(2cor)}$, $Q_{(3cor)}$, which represents a measure of the deviation of the test subject 125 to be calibrated from the standard value and which is Q=158.52 L/hour for the measurement series listed as an example in Table 1. To determine the precise deviation, a first correction value or correction factor $k_1$ is ascertained for the reference measurement section 101-1, which results from the deviation of the mean value for $Q_{master}$, i.e., 160.46 L/hour, in relation to the standard flow rate value of 160.0 L/hour, as $k_1$=-0.46. On this basis, a further correction value or correction factor $k_{2,T}$ is determined, which may be calculated on the basis of the following equation (1):

$$k_{2,T} = Q_{master} - Q_{cal} - |k_{1,T}| \qquad \text{equation (1)}$$

In this case, $Q_{master}$ denotes the mean value of the flow rate measured values detected by the flow meter 115, $Q_{cal}$ denotes the mean flow volume at the test subject 125, and $|k_{1,T}|$ denotes the absolute value of the first correction value. $Q_{cal}$ corresponds to the mean value in Table 1 resulting from $Q_{(1cor)}$, $Q_{(2cor)}$, $Q_{(3cor)}$. Therefore, equation (1) supplies a correction value $k_{2,T}$, which is 1.48 L/hour, for the measurement series shown as an example in Table 1. Both the correction value $k_{2,T}$ and also the correction value $k_{1,T}$ can apply only for the specified measurement temperature T, so that to prepare a calibration curve extending over a broad temperature curve, a plurality of measurement series at different temperatures in the desired temperature range is required, wherein the correction values or correction factors ascertained at a respective temperature are used as support points for the calibration curve. An alternative formulation of equation (1) can be represented by equation (2):

$$k_{2,T} = Q_{setpoint} - Q \qquad \text{equation (2)}$$

In this case, $Q_{setpoint}$ denotes a flow volume to be measured, where Q denotes the mean value of the flow rate measured values detected by the flow meter 115.

By way of the introduction of the correction value $k_1$ for the reference measurement section 101-1, it is possible to use different reference flow meters during the calibration within a measurement series, by considering the respective correction value $k_1$ associated with a flow meter for a back calculation to a shared database.

TABLE 1

| $Q_{Master}$ | $T_{Master}$ | p | $Q_{(1)}$ | $Q_{(1cor)}$ | $Q_{(2)}$ | $Q_{(2cor)}$ | $Q_{(3)}$ | $Q_{(3cor)}$ |
|---|---|---|---|---|---|---|---|---|
| 160.1 | 90.0 | 3.05 | 158.8 | 158.8 | 157.8 | 157.8 | 159.9 | 159.9 |
| 160.2 | 90.1 | 3.04 | 159.2 | 159.2 | 158.2 | 158.2 | 158.7 | 158.7 |
| 159.9 | 90.1 | 3.06 | 158.6 | 158.6 | 158.6 | 158.6 | 158.2 | 158.2 |
| 160 | 90.2 | 2.98 | 158.5 | 158.5 | 158.7 | 158.7 | 157.9 | 157.9 |
| 161 | 89.9 | 3.0 | 156.9 | — | 158.2 | 158.2 | 158.5 | 158.5 |
| 160.9 | 89.8 | 3.02 | 158.4 | 158.4 | 157.9 | 157.9 | 156.8 | — |
| 160.7 | 90.0 | 3.04 | 158.6 | 158.6 | 158.0 | 158.0 | 158.1 | 158.1 |
| 160.8 | 90.1 | 3.01 | 159.4 | 159.4 | 158.5 | 158.5 | 158.3 | 158.3 |
| 160.5 | 90.0 | 2.98 | 158.9 | 158.9 | 158.3 | 158.3 | 158.4 | 158.4 |
| 160.5 | 89.9 | 2.99 | 158.7 | 158.7 | 157.9 | 157.9 | 159.1 | 159.1 |
| 160.46 | 90.01 | 3.02 | — | 158.79 | — | 158.21 | — | 158.57 |

Q = 158.52
Correction factor $k_1$ = -0.46
$k_{2,T}$ = 1.48

Table 2 shows an example of the dependence of the correction value $k_{2,T}$ on the temperature of the medium flowing through the test measurement section 101-2 and on the flow rate thereof for a broad temperature range 70° C.≤T≤100° C. and flow rate range Q at 70 L/hour≤Q≤200 L/hour. Table 2 essentially results from a synthesis of a plurality of measured values prepared according to the scheme of Table 1 for different temperatures of the medium and different flow rates in each case. Therefore, Table 2 forms the cornerstones of a calibration curve or calibration function. Intermediate values are determinable by interpolation.

TABLE 2

| Q (l/h) | Correction value $k_{2,T}$ | | | |
|---|---|---|---|---|
| | T1 = 70° C. | T2 = 80° C. | T3 = 90° C. | T4 = 100° C. |
| 40 | | | | |
| 50 | | | | |
| 60 | | | | |
| 70 | 0.96 | 1.10 | 1.26 | |
| 80 | | | | |
| 90 | | | | |
| 100 | | | | |
| 110 | | | | |
| 120 | 1.06 | 1.22 | | |
| 130 | | | | |
| 140 | | | | |
| 150 | 1.12 | | | |
| 160 | 1.16 | 1.28 | 1.48 | 1.58 |
| 170 | | | | |
| 180 | | | | |
| 190 | | | | |
| 200 | 1.14 | 1.30 | 1.54 | |
| 210 | | | | |
| 220 | | | | |
| 230 | | | | |

Table 3 shows, for the ascertainment of a correction value or correction factor $k_3$, an example of a measurement series—similar to Table 1—for calibrating a test subject 125, for a standard flow rate value, which is determined as a setpoint, of 160 L/hour at a temperature T 90° C. and a system pressure of 3 bar. In this case, the correction factor $k_3$ is used for a—in contrast to Table 1 in conjunction with equation (2) or (3)—still more accurate determination of the flow volume and for this purpose takes into consideration an additional measurement of the flow rate which has passed through the reference measurement section and test measurement section during a calibration procedure, with the aid of the weighing container 140 at a removal time of 15 seconds. Flow rate values $Q_{master}$ detected by the flow meter 115 and the simultaneous temperature measured values $T_{master}$ in ° C. corresponding thereto at the temperature measurement point 110 and pressure measured values $p_1$ in bar at the pressure measurement point 113 for the reference measurement section 101-1 are listed in the first three columns of Table 1, while in the adjacent columns, on the one hand the flow rate values $Q_{(1)}$, $Q_{(2)}$, $Q_{(3)}$, which are measured in the test measurement section 101-2 at the test subject 125 to be calibrated, and associated correction values $Q_{(1cor)}$, $Q_{(2cor)}$, $Q_{(3cor)}$ are shown opposite and, on the other hand, a flow volume measured in the weighing container 140 is entered in the last column. The measured values $Q_{(1)}$, $Q_{(2)}$, and $Q_{(3)}$ detected by the flow meter or test subject 125 are measured in rapid succession within a chronological measurement window, to take into consideration fluctuations and/or variations within the preset measurement window. To additionally eliminate systematic measurement errors, for example, metrological artifacts in the measured values detected by the test subject 125, which are outside a predefined tolerance range of ±2% with respect to the standard flow rate value of 160.0 L/hour, for each measured value $Q_{(1)}$, $Q_{(2)}$, and $Q_{(3)}$, associated correction measured values $Q_{(1cor)}$, $Q_{(2cor)}$, $Q_{(3cor)}$ are ascertained, in that values located outside the tolerance range remain unconsidered. A respective mean value is formed from the respective measured values for $Q_{master}$, $T_{master}$, p, and $Q_{(1cor)}$, $Q_{(2cor)}$, $Q_{(3cor)}$, wherein a single mean value Q is formed from the mean values for $Q_{(1cor)}$, $Q_{(2cor)}$, $Q_{(3cor)}$, which represents a measure of the deviation of the test subject 125 to be calibrated from the standard value and which is Q=161.84 L/hour for the measurement series listed as an example in Table 3. To determine the precise deviation, in addition the measured values obtained by weighing are taken into consideration by means of the correction value or correction factor $k_3$. The calculation of the third correction value $k_3$ takes place in this case according to the following equation:

$$k_{3,\ 160} = Q_{setpoint} - Q_{master} - Q_{weighing} + Q_{cal} \qquad \text{equation (3)}$$

In this case, $Q_{setpoint}$ denotes the flow volume to be measured, $Q_{master}$ denotes the respective mean value of the flow volume measured at the reference measurement section, $Q_{weighing}$ denotes the respective mean value of the flow volume measured at the reference scale 140, $Q_{cal}$ denotes the mean flow volume at the test subject 125, and $k_{3,160}$ denotes the third correction value during a flow of a predetermined flow volume. Using the measurement series listed as an example in Table 3, the following therefore results for the third correction value $k_{3,160}$ 160−161.02−158.97+161.84=1.85 L/hour, i.e., at a predetermined flow rate of 160 L/hour and a media temperature of T≈90° C., a mean correction quantity of 1.85 L/hour results for the flow meter to be calibrated.

To obtain the correction value or correction factor $k_3$, the optionally provided weighing procedure is carried out in the scope of the calibration, i.e., when stable pressure conditions and temperature conditions exist in the device 100, which are provided when the check of the corresponding measurement points has the result $p_3 \approx p_4$ and $p_6 \approx p_1$, whereupon the switching valve 132 is opened and the switching valve 135 provided for activating a weighing procedure is switched so that the medium 102, which comes out of the test measurement section 101-2 and is thereupon cooled down by means of the heat exchanger 134, enters the weighing container 140 in a time-controlled manner. The switching valve 135 provided for activating the weighing procedure is closed thereafter and the circulation container 152 is refilled if necessary by means of the switching valve 154. After a predetermined relaxation time, the filling quantity of the weighing container 140 is measured by means of the weighing cells 142 and the fill level meter 141 and stored in a calibration table.

TABLE 3

| $Q_{Master}$ | $T_{Master}$ | p | $Q_{(1)}$ | $Q_{(1corr)}$ | $Q_{(2)}$ | $Q_{(2corr)}$ | $Q_{(3)}$ | $Q_{(3corr)}$ | $Q_{weighing}$ |
|---|---|---|---|---|---|---|---|---|---|
| 161.53 | 89.90 | 2.98 | 161.70 | 161.70 | 161.53 | 161.53 | 162.54 | 162.54 | 159.3 |
| 161.10 | 90.00 | 3.05 | 161.80 | 161.80 | 161.21 | 161.21 | 162.21 | 162.21 | |
| 161.58 | 90.30 | 3.08 | 162.23 | 162.23 | 161.96 | 161.96 | 161.83 | 161.83 | |
| 160.66 | 90.80 | 3.15 | 161.72 | 161.72 | 160.58 | 160.58 | 161.96 | 161.96 | |
| 160.80 | 90.10 | 3.01 | 162.40 | 162.40 | 161.82 | 161.82 | 162.14 | 162.14 | |
| 161.46 | 90.30 | 3.00 | 162.22 | 162.22 | 161.56 | 161.56 | 162.53 | 162.53 | |
| 161.54 | 90.10 | 3.03 | 161.92 | 161.92 | 161.74 | 161.74 | 161.75 | 161.75 | |
| 160.90 | 90.10 | 3.06 | 161.66 | 161.66 | 161.22 | 161.22 | 161.83 | 161.83 | |
| 161.10 | 90.00 | 3.01 | 160.98 | 160.98 | 161.85 | 161.85 | 161.52 | 161.52 | |
| 160.96 | 89.90 | 2.98 | 160.56 | 160.56 | 161.64 | 161.64 | 162.85 | 162.85 | |

TABLE 3-continued

| $Q_{Master}$ | $T_{Master}$ | p | $Q_{(1)}$ | $Q_{(1corr)}$ | $Q_{(2)}$ | $Q_{(2corr)}$ | $Q_{(3)}$ | $Q_{(3corr)}$ | $Q_{weighing}$ |
|---|---|---|---|---|---|---|---|---|---|
| 160.86 | 89.90 | 3.00 | 161.90 | 161.90 | 161.53 | 161.53 | 162.41 | 162.41 | 158.7 |
| 160.92 | 89.80 | 2.95 | 161.85 | 161.85 | 162.03 | 162.03 | 161.79 | 161.79 | |
| 161.21 | 89.90 | 3.04 | 162.43 | 162.43 | 161.96 | 161.96 | 161.83 | 161.83 | |
| 161.22 | 90.00 | 3.04 | 161.60 | 161.60 | 161.42 | 161.42 | 162.54 | 162.54 | |
| 161.52 | 90.10 | 2.95 | 162.48 | 162.48 | 161.52 | 161.52 | 162.38 | 162.38 | |
| 160.15 | 90.00 | 2.96 | 162.22 | 162.22 | 162.36 | 162.36 | 161.42 | 161.42 | |
| 160.50 | 89.80 | 2.99 | 161.70 | 161.70 | 161.41 | 161.41 | 162.05 | 162.05 | |
| 160.85 | 89.90 | 3.00 | 162.41 | 162.41 | 161.52 | 161.52 | 161.72 | 162.72 | |
| 161.87 | 89.80 | 2.92 | 161.67 | 161.67 | 161.43 | 161.43 | 162.33 | 162.33 | |
| 161.00 | 89.90 | 2.98 | 162.50 | 162.50 | 161.25 | 161.25 | 161.56 | 161.56 | |
| 160.54 | 90.00 | 3.02 | 162.45 | 162.45 | 161.52 | 161.52 | 162.12 | 162.12 | 158.9 |
| 160.20 | 90.10 | 3.04 | 162.27 | 162.27 | 161.43 | 161.43 | 161.92 | 161.92 | |
| 160.47 | 90.10 | 2.92 | 161.65 | 161.65 | 161.28 | 161.28 | 160.98 | 160.98 | |
| 160.85 | 90.00 | 3.02 | 161.21 | 161.21 | 161.89 | 161.89 | 161.76 | 161.76 | |
| 160.87 | 90.00 | 3.04 | 162.01 | 162.01 | 161.92 | 161.92 | 161.88 | 161.88 | |
| 160.90 | 89.80 | 3.02 | 161.40 | 161.40 | 162.39 | 162.39 | 161.92 | 161.92 | |
| 160.92 | 89.80 | 3.01 | 162.23 | 162.23 | 162.54 | 162.54 | 161.33 | 161.33 | |
| 161.83 | 89.90 | 3.02 | 161.65 | 161.65 | 161.88 | 161.88 | 161.45 | 161.45 | |
| 160.50 | 90.00 | 2.98 | 162.05 | 162.05 | 161.83 | 161.83 | 162.57 | 162.57 | |
| 160.89 | 89.90 | 2.96 | 161.30 | 161.30 | 162.37 | 162.37 | 161.74 | 161.74 | |
| 161.02 | 90.01 | 3.01 | 161.87 | | 161.69 | | 161.96 | | 158.97 |
| | | | | | 161.84 | | | | |

Figure 2:
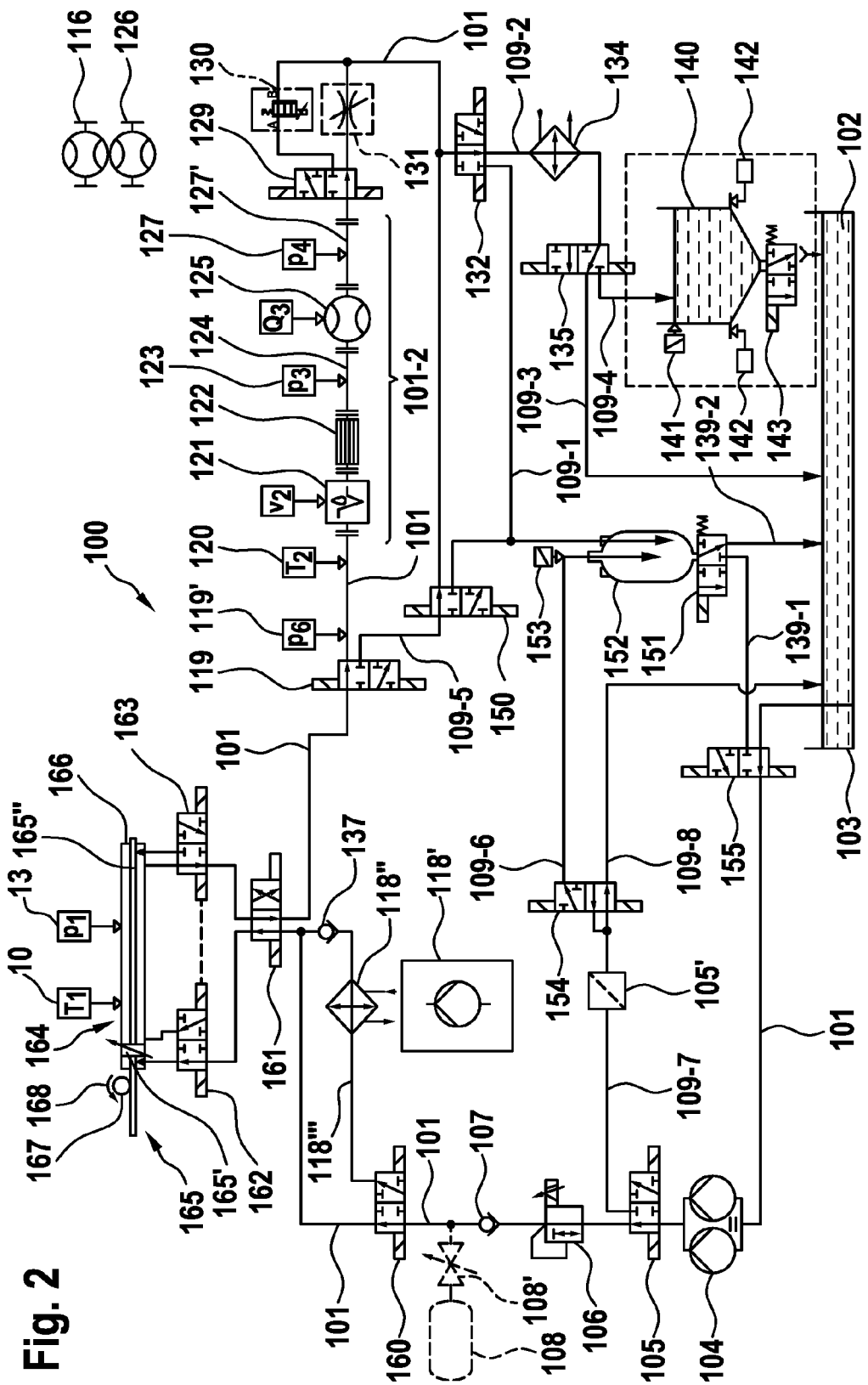
FIG. 2 shows the calibration device according to a second embodiment.

FIG. 2 shows the calibration device 100 according to the invention according to a second embodiment, which differs from the first embodiment shown in FIG. 1 essentially in that the reference measurement section has a linear piston drive unit 164, which advantageously enables a practically pulse-free measurement with a higher accuracy in comparison to the first embodiment (FIG. 1). In this case, a linear piston 165, which is accommodated so it is axially displaceable in an operating cylinder 166, relays the medium flowing into the operating cylinder, alternately in the forward and reverse direction depending on the switch position of the valves 161, 162, and 163, to the test measurement section 101-2 as a defined uniform volume stream, wherein the velocity of the linear piston 165 is measured via a rotary encoder 167 moved according to the arrow 168. For this purpose, the pump 104 pumps the fluid medium 102 out of the storage tank 103 into the line 101. The medium 102 flows via the circulation valve 105, the throttle valve 106, and the check valve 107 past the throttle valve 108', which is provided with the membrane 108, to the thermal valve 160. The thermal valve 160, which is designed as a 4/2-multiport valve, releases, in its first position, a line section of the line 101 leading directly to a switching valve 161, while it blocks the direct line section of the line 101 in its second position, and instead releases a secondary line 118''' extending in parallel thereto, which leads via a heat exchanger 118'' with associated temperature control device 118' and a check valve 137 to the switching valve 161. In the first switch position of the switching valve 161, a passage of the line 101 through the linear drive unit 164 for forward running for the linear piston 165 is producible, wherein the medium coming from the thermal valve 160 can flow in via the front end of the linear drive unit 164 and the linear piston 165 runs forward in the operating cylinder 166; the medium can thus flow out via the rear end of the linear drive unit 164 to the test measurement section 101-2. The switching valve 161 switches over into its second switch position when the linear piston 165 executes its operating stroke in the forward running direction and reaches its end location at the stroke end, i.e., at the rear end of the linear drive unit 164; in the second switch position, the switching valve 161 is reversed in relation to its first switch position, whereby the passage of the line 101 through the linear drive unit 164 is now producible for reverse running for the linear piston 165, so that the medium coming from the thermal valve can flow in via the rear end of the linear drive unit 164 and the linear piston 165 runs backward in the operating cylinder 166, wherein the medium can flow out via the front end of the linear drive unit 164 to the test measurement section 101-2. The switching valve 161 then switches over into its first switch position again for the next work cycle. Two switching valves 162, 163 are arranged between the switching valve 161 and the linear drive unit 164, which are essentially used to either flush or fill the forward or the reverse space of the linear drive unit 164 using the medium 102 when the linear piston 165 reaches one of its two axial end positions within the operating cylinder 166, at each of which a direction reversal begins, which takes place in cooperation with switching over the switching valve 161. In this case, in its first switch position, the switching valve 162 releases the passage extending between the switching valve 161 and the front end of the linear drive device 164, while it blocks this passage in its second switch position. The switching valve 163 releases the passage extending between the switching valve 161 and the rear end of the linear drive device 164 both in its first and also in its second switch position. The switching valves 161, 162, and 163 are designed as 4/2-multiport valves.

To carry out a calibration in the "cold" state of the medium, i.e., without heating of the medium pumped out of the storage tank 103, the thermal valve 160 now remains in its first valve switch position, in which the line section of the line 101 leading directly to the switching valve 161 is released. To operate the linear drive unit 164 as the reference measurement section, the switching valves 161, 162, and 163 are provided, which are designed as 4/2-multiport valves. The switching valve is used to switch the inflow of the medium to the linear drive unit 164 and the outflow from the linear drive unit 164 depending on the movement direction of the linear piston 165. To calibrate a flow meter or test subject 125, the linear piston 165 is accelerated to a predetermined velocity. After reaching the predetermined velocity, the measurement procedure is started and it is stopped before the deceleration of the linear piston at its respective end position. After a relatively short flushing time by means of the two switching valves 162, 163 to fill the operating cylinder, a restart is performed by activating the switching valve 161 by way of signal reversal and at the same time changing the thrust direction of the linear piston 165 in the linear drive unit 164.

To carry out a calibration in the "hot" state of the medium using the calibration device 100 according to FIG. 2, i.e., by heating the medium to a predetermined temperature, the thermal valve 160 is switched over into its second valve switch position, in which the line section 101 leading directly from the thermal valve 160 to the switching valve 161 is blocked and the secondary line 118''' extending in parallel thereto is released, which leads from the thermal valve 160 via a heat exchanger 118'' having associated temperature control unit 118' and a check valve 137 to the switching valve 161. If a predetermined measurement temperature of the medium 102 is reached, the calibration procedure is thus started by switching the thermal valve 160 into its second switch position, and the medium 102 flows further to the switching valve 161. In the first switch position of the switching valve 161, the medium 102 reaches the linear piston drive unit 164 via the switching valve 162, which is switched into its first switch position. The linear piston 165 is accelerated therein to a predetermined velocity in the forward running direction. The medium 102 is pressed in this case in the forward running direction through the operating cylinder, exits at the rear end of the linear drive unit 164, and then reaches the switching valve 161 via the switching valve 163. From there, the medium 102 flows via the switched-through idle valve 119 into the test measurement section 104' having the flow meter or test subject 125 to be calibrated. For the following return running of the linear piston 165, after the flushing of the linear drive unit 164, the switching valve 161 is reversed by switching over into its second switch position. The linear piston is accelerated in the reverse running direction to the predetermined velocity, wherein the medium flows out via the front end of the linear drive unit and reaches the test measurement section 101-2 via the switching valve 162, then via the reversed switching valve 161, and finally via the idle valve 119. The test measurement section 101-2 is designed substantially identically to the first embodiment of FIG. 1, wherein identical reference signs denote identical or similar elements as in FIG. 1. This also applies to the remaining structure of the second embodiment according to FIG. 2. The switching valve 129, which is downstream of the test measurement section 101-2 in the flow direction, is, as in the embodiment of FIG. 1, provided to switch the flow path either via the throttle valve 130 or the throttle valve 131. From there, the medium 102 reaches the switching valve 132, in the first switch position of which the medium 102 can be conducted to the weighing container 140, if an additional mass determination of the medium 102 conducted through the test measurement section 101-2 is to be performed. In this case, after passage through the switching valve 132, which is switched into its first switch position, the medium 102 is cooled down in the heat exchanger 134 and from there reaches the switching valve 135, which conducts the medium 102 to the weighing container 140 in its first switch position, while in its second switch position, the medium 102 reaches the storage tank 103 again.

Figure 3:
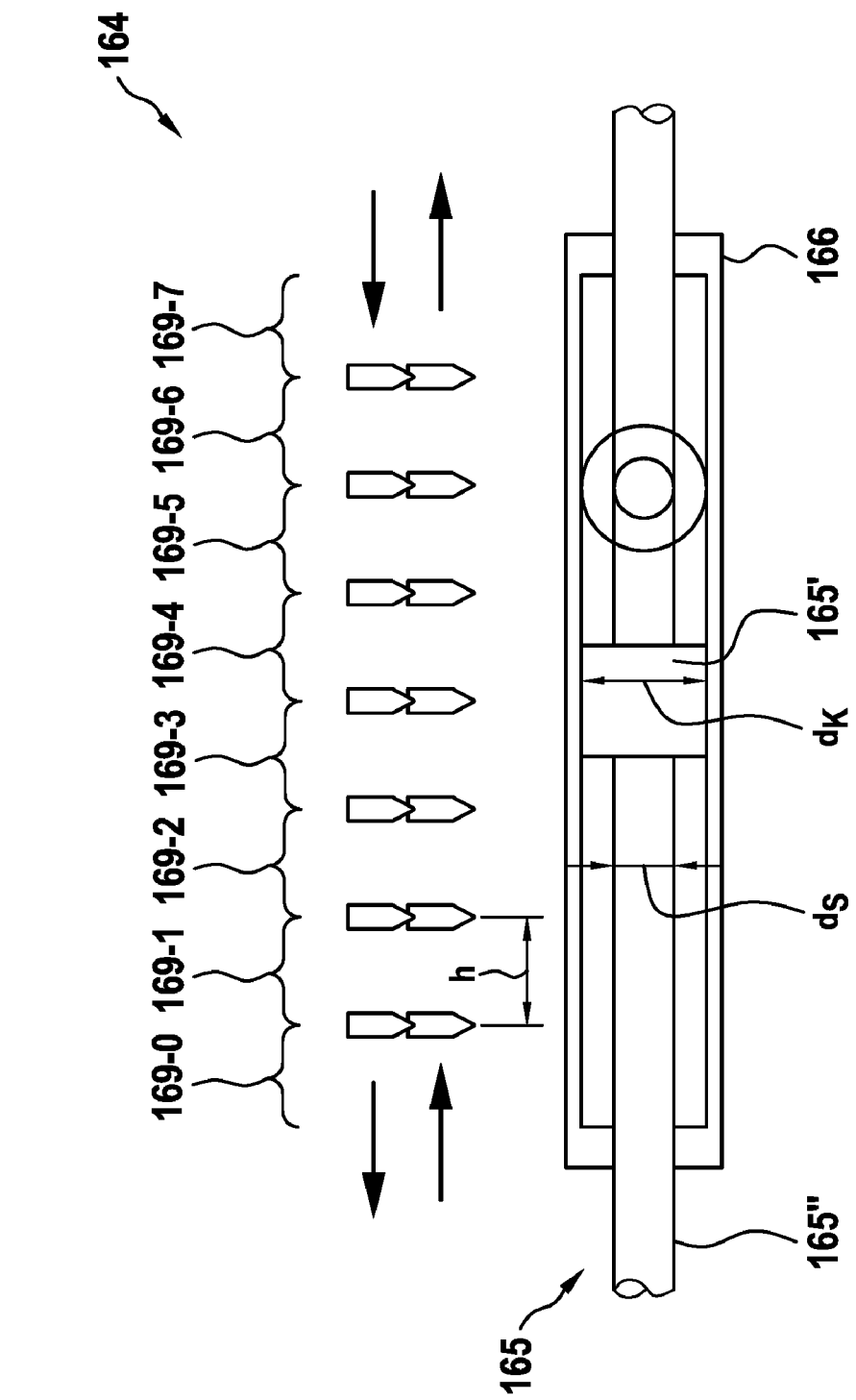
FIG. 3 shows a detail of the device of FIG. 2.

FIG. 3 shows a very schematic detail view of the linear piston drive unit 164 of FIG. 2. The linear piston 165 has a piston rod 165'' and a thickening 165' formed radially protruding thereon, the radial external diameter $d_k$ of which of the thickening 165' approximately corresponds to the radial internal diameter of the operating cylinder 166 and is larger than the radial diameter $d_S$ of the piston rod 154''. The substantially ring-shaped cavity between cylindrical inner wall of the operating cylinder and the piston rod is used as a receptacle volume for the medium, which flows into the operating cylinder via a first opening (not shown in FIG. 3), and which is pressed out of the operating cylinder by means of the radial thickening 165' formed on the piston rod during a work cycle of the linear piston 165 via a second opening (not shown in FIG. 3). The total stroke of the operating cylinder 166 is divided into equally long segments 169-0 to 169-7 of constant axial length h, wherein a position sensor is arranged in each case at the respective transition between two directly adjacent segments, which signals a control unit when the thickening 165' of the linear piston 165 reaches the position of the respective sensor. During the forward running of the linear piston 165, it is accelerated in a first segment to a predetermined velocity and decelerated again in the last segment, while the linear piston 165 moves at constant velocity in the segments located in between and in this case, every time the thickening of the linear piston 165 reaches or passes one of these segments, the sensor positioned thereon signals this to the control unit, which carries out a measurement procedure in reaction thereto, during which both the flow $Q_{master}$ in the corresponding segment of the linear drive unit and the flow chronologically corresponding thereto at the test subject 125 are measured. For this purpose, the flow in the linear drive unit is determined according to the effective inner volume of the operating cylinder 166 and the time span Δt, which the linear piston 165 requires to pass through the length of the corresponding segment at constant velocity. During the reverse running of the linear piston 165, it passes through the segments 169-0 to 169-7 in the reverse sequence, wherein the linear piston 165, which is standing with its thickening 165' in the last segment, is accelerated in the next-to-last segment and is decelerated in the first segment, while it moves at constant velocity in the segments located in between and at the same time the respective measurement procedures are carried out by means of the sensors positioned at the transitions. The constructive design of the operating cylinder and the linear piston of the linear piston drive unit are oriented to the order of magnitude of the flow volume to be measured.

Table 4 shows an example of a measurement series used to calibrate a test subject 125 using the device according to FIG. 2. In this case, the measurement data listed in Table 4 for each work cycle, i.e., for a respective forward run or return run of the linear piston 165, are divided into five measurement data sets in each case, wherein each data set comprises the measured values for the flow $Q_{master}$, the temperature $T_{master}$, and the pressure p in the linear drive unit 164 used as the reference measuring section and the flow measured value $Q_{test\ subject}$ corresponding thereto on the test subject in the test measurement section and the corrected value $Q_{(1cor)}$ thereof for a respective segment within the total stroke of the linear piston, in which the latter moves at constant velocity. The five data sets listed one under another for a respective work cycle are recorded for five immediately successive segments. In the last column, for each of the four successive work cycles, the flow volume $Q_{weighing}$ ascertained in each case by a weighing procedure using the weighing container 140 is indicated. For this purpose, the control unit controls the two switching valves 132, 135 in reaction to the signals from the position sensors in the linear drive unit 164, to release the flow path to the weighing container 140 during the time span in which the linear piston moves at constant velocity through the corresponding segments. The values indicated in the lowermost line of Table 4 are mean values calculated in each case from the consideration together of the individual work cycles for $Q_{master}$, $T_{master}$, p, $Q_{test\ subject}$, $Q_{(1cor)}$, and $Q_{weighing}$.

A correction value or correction factor $k_{3,160}$ for a setpoint flow is determinable on the basis of the equation (3) on the basis of the measured values indicated in Table 4 for $Q_{master}$, $T_{master}$, p, $Q_{test\ subject}$, $Q_{(1cor)}$, and $Q_{weighing}$. The mean correction quantity is accordingly, at a setpoint of 160.0 L/hour and a media temperature of 90.19° C., according to $k_{3,160} = Q_{setpoint} - Q_{master} - Q_{weighing} + Q_{cal} = 160.0 - 160.63 - 159.46 + 161.77$ 1.69 L/hour.

TABLE 4

|  | $Q_{Master}$ | $T_{Master}$ | p | $Q_{Prüfling}$ | $Q_{(1corr)}$ | $Q_{weighing}$ |
|---|---|---|---|---|---|---|
| foreward run | 160.15 | 89.90 | 3.51 | 161.70 | 161.70 | 159.6 |
|  | 160.30 | 90.00 | 3.52 | 161.60 | 161.60 |  |
|  | 160.48 | 90.30 | 3.52 | 161.88 | 161.88 |  |
|  | 159.88 | 90.80 | 3.53 | 161.27 | 161.72 |  |
|  | 160.12 | 89.90 | 3.49 | 161.90 | 161.90 |  |
| reverse run | 160.92 | 90.28 | 3.56 | 161.85 | 161.85 | 159.43 |
|  | 160.71 | 90.19 | 3.58 | 161.66 | 161.66 |  |
|  | 160.82 | 90.17 | 3.58 | 161.60 | 161.60 |  |
|  | 160.75 | 90.18 | 3.57 | 161.78 | 161.78 |  |
|  | 160.89 | 90.22 | 3.57 | 161.22 | 161.22 |  |
| foreward run | 160.78 | 90.21 | 3.57 | 161.88 | 161.88 | 159.89 |
|  | 160.69 | 90.24 | 3.60 | 161.78 | 161.78 |  |
|  | 160.71 | 90.19 | 3.58 | 161.72 | 161.72 |  |
|  | 160.70 | 90.20 | 3.57 | 161.85 | 161.85 |  |
|  | 160.69 | 90.18 | 3.58 | 161.70 | 161.70 |  |
| reverse run | 160.54 | 90.16 | 3.56 | 162.45 | 162.45 | 158.9 |
|  | 161.20 | 90.18 | 3.54 | 162.27 | 162.27 |  |
|  | 160.47 | 90.18 | 3.50 | 161.65 | 161.65 |  |
|  | 160.85 | 90.20 | 3.50 | 161.21 | 161.21 |  |
|  | 160.87 | 90.21 | 3.52 | 162.01 | 162.01 |  |
|  | 160.63 | 90.19 | 3.55 | 161.77 161.77 |  | 159.46 |

To also take into consideration measurement uncertainties in the calibration, in addition to the correction value or correction factor $k_3$, which detects the random, i.e., statistical components of the measurement deviation, further variables, which are used to estimate a systematic component of the measurement deviation, are to be considered according to the following equation, which is based on mathematical statistics and/or probability theory:

$$\pm u = 0.5 * \sqrt{\frac{Q_{setpoint}^2 - Q_{master}^2 - Q_{weighing}^2 + Q_{calibrate}^2 +}{c_R^2 + c_S^2 + c_L^2 + c_I^2 + c_V^2}} \quad \text{Equation (4a)}$$

In this case, ±u denotes the measurement uncertainty, while the variables $c_R$, $c_L$, $c_S$, $c_I$ and $c_V$ denote the systematic components of the measurement deviation.

Thus, $c_R$ denotes a variable which considers a range span, reaction time, or measurement tolerance, which can occur as a comparison point difference upon the comparison of measurements at the reference flow meter and the test subject to be calibrated. A variable is denoted by $c_L$, which is used to linearize the reference measurement section and considers metrological scattering, for example, as a result of intrinsic oscillations of the fluid stream, switching pulsations of valves, and pressure variations due to regulating procedures. A variable is denoted by $c_S$, which considers aging processes, which impair the long-term stability, within the reference measurement section, for example, due to abrasion at flow edges, due to the occurrence of leaks or deposits, or due to electrical wear. A variable is denoted by $c_I$, which considers an uncertainty occurring upon the interpolation and/or calculation of intermediate values. Finally, a variable is denoted by $c_V$, which considers a viscosity difference, which occurs in particular upon hot calibration with cyclic weighing during the refilling of the medium from the storage tank as a result of different media temperatures. Empirical studies have shown that a measurement uncertainty of approximately 0.22 L/hour is to be used for $c_R$, a measurement uncertainty in the range of 0.20 to 0.3 is to be used for $c_L$, a measurement uncertainty in the range of 0.12 to 0.15 is to be used for $c_S$, a measurement uncertainty in the range of 0.10 to 0.15 is to be used for $c_I$, and a measurement uncertainty of approximately 0.05 is to be used for $c_V$.

While neglecting the systematic variables $c_I$ and $c_V$, equation (4a) may also be represented according to the following equation in explicit dependence on the correction value or correction factor $k_{3,T}$:

$$\pm u = 0.5 * \sqrt{k_{3,T}^2 + c_R^2 + c_S^2 + c_L^2} \quad \text{Equation (4b)}$$

As an example, the following results on the basis of the measurement database listed in Table 3 for the overall measurement uncertainty according to equation (4b):

$\pm u = 0.5 * \sqrt{1.85^2 + 0.22^2 + 0.15^2 + 0.30^2} = 0.947$ in units of liters/hour. Therefore, according to this database, the flow rate value of 160 L/hour is to be understood with a—rounded—minimum tolerance of ±1, so that 160±1 L/hour applies to the flow rate.

Figure 4:
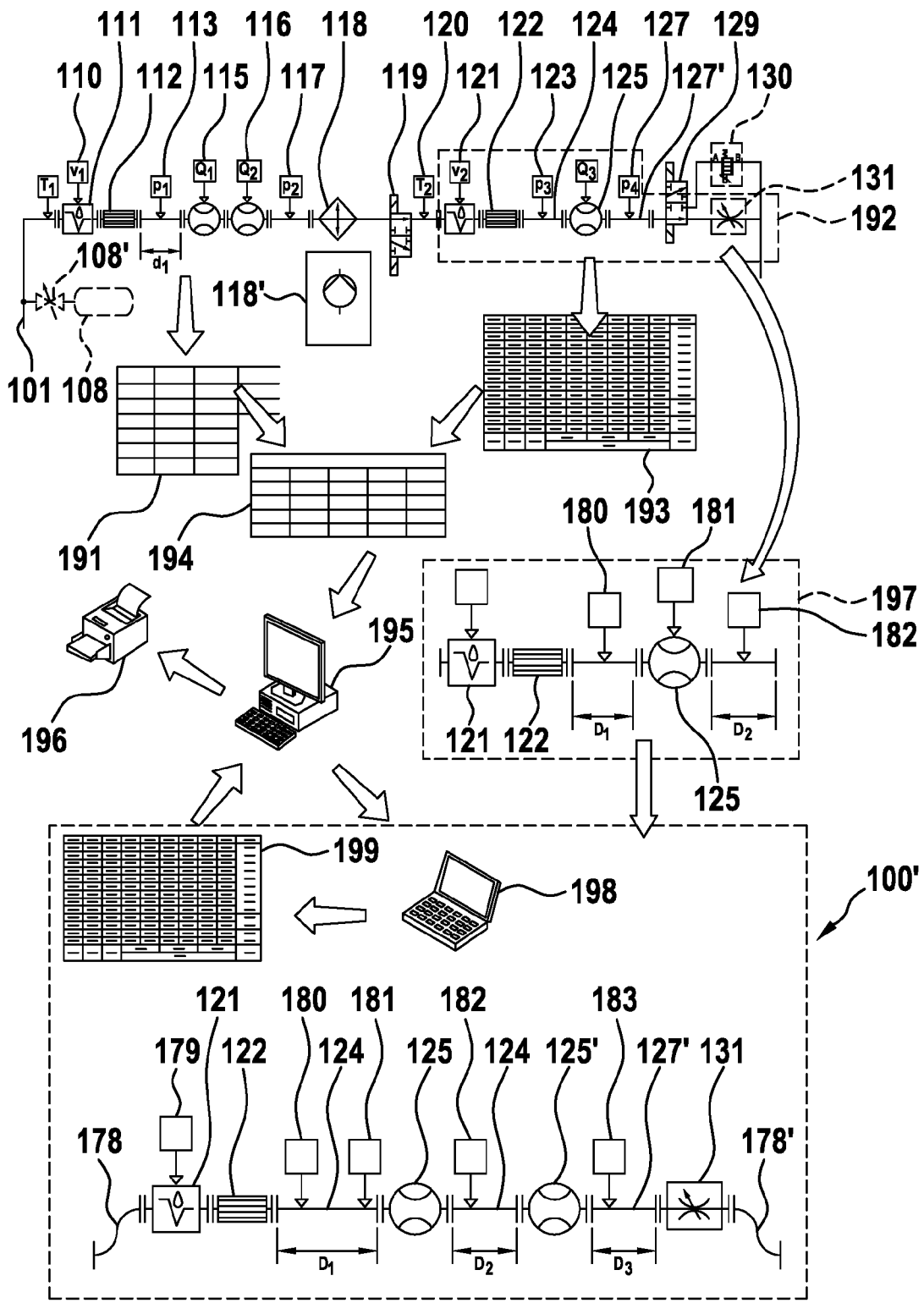
FIG. 4 shows the calibration device according to a third embodiment, which is provided for mobile use.

FIG. 4 shows a schematic illustration of the calibration device 100' according to the invention, which is formed from a part of the calibration device 100 according to a first embodiment of FIG. 1 and—in contrast to the calibration device 100 of FIG. 1, which is provided for stationary use—is provided for mobile use. In this case, identical reference signs as in FIG. 1 denote identical or similar elements. To be able to carry out a calibration in a mobile manner, i.e., at an arbitrary usage location, for example, at a customer, a part of the device 100 according to the first embodiment, which is shown on the basis of a detail in the upper region of FIG. 4, is removable, i.e., is formed as a modular unit 192. This modular unit is essentially the test measurement section 101-2 of the device 100 of FIG. 1. In order to now design the modular unit 192 as usable for the mobile, on-location use, firstly the stationary device 100 is subjected to the above-described calibration procedure for a flow meter or test subject 125 accommodated in the modular unit 192. In this case, on the one hand, the above-described variables $c_R$, $c_L$, $c_S$, $c_I$, and $c_V$ are detected for the two standard flow meters 115, 116 on the basis of a table 191 and, on the other hand, a specification table 193 is prepared similarly to the above-described Table 3 for the modular unit 192. Both data groups 191, 193 are combined to form a reference table 194, which characterizes the modular unit 192 and is stored as a databank in a station computer 195. The modular unit 192 is thereafter removed from the stationary device 100 and transferred to the respective usage location, where the modular unit is used as the reference measurement section for a test subject 125' to be calibrated. For this purpose, the test subject 125' to be calibrated is joined to the modular unit 192, by fluidically connecting the test subject 125' on the intake side to the outflow-side end of the discharge section 124 of the modular unit 192 and on the outlet side to a drain section 127' having a pressure measurement point 183, at which a proportional valve, preferably the proportional throttle valve 131 of the modular unit 192, is flanged on. For the connection to a media supply, a connection line 178, which is arranged before the viscosity sensor 121 of the modular unit 192 on the inflow side, and a connection line 178', which is arranged after a proportional valve 131 on the outflow side, are provided. The calibration device 100' designed as mobile is therefore substantially composed of the modular unit 192, the flow meter or test subject 125' flanged thereon, the drain section 127' having downstream proportional throttle valve 131, and the two connection lines 178, 178'. The calibration device 100' is associated with a mobile station computer unit 198, which is used for the control of the elements accommodated in the calibration device 100' and the measurement data detection and the analysis thereof on the basis of the reference table 194, which was previously transferred from the station computer 195 to the mobile station computer unit 198. To record the calibration operation, the calibration device 100' is charged with the medium, wherein the test subject 125' is heated by the medium flowing through to the predetermined temperature, which is monitored by the mobile station computer unit 198. The required operating pressure is adjustable manually, for example, by means of the proportional throttle valve 131. If the predetermined temperature is reached, the corresponding flow measurement data are thus detected automatically and continuously by means of the station computer unit 198 at the test subject 125' and stored in processed form in a calibration table 199, wherein the corresponding correction factor for the flow meter or test subject 125' and the measurement uncertainty are calculated on the basis of equations (4a) and (4b), respectively. Finally, a calibration log for the test subject 125' can be calculated therefrom.

Figure 5:
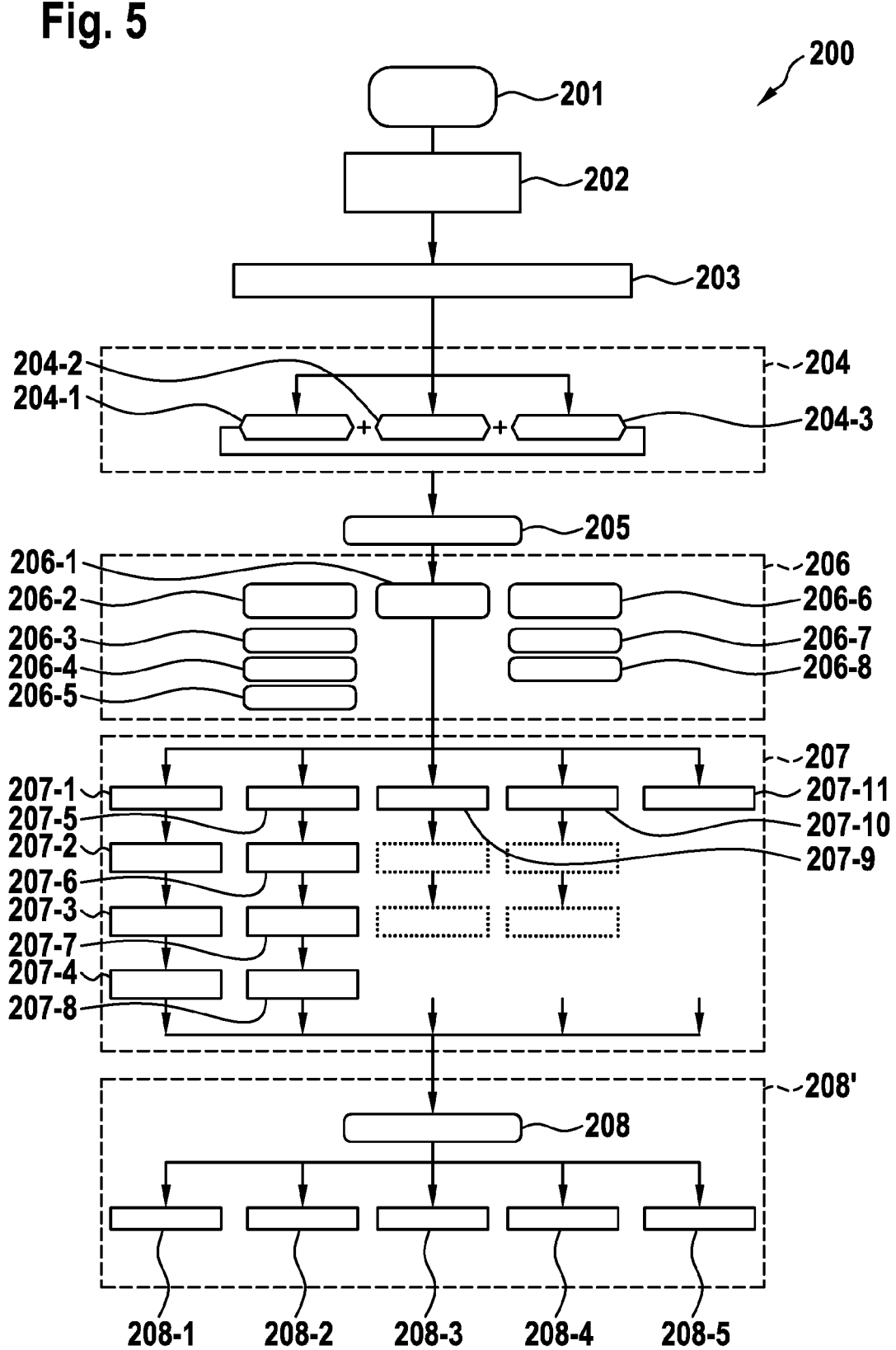
FIG. 5 shows a flow chart having the essential method steps of a main program for controlling the calibration device.

FIG. 5 shows a flow chart 200 having the essential method steps of a main program as part of a control method according to the invention, which is used to control the calibration device 100 according to the invention and to detect measurement data and implemented in the control unit (not shown). In a first initializing step 201, the calibration device 100 is turned on and in a following step 202, the reference measurement section 101-1 is filled with the medium and deaerated. Thereafter, in a step 203, reference functions in the reference measurement section, for example, the sensors accommodated therein, are activated, whereupon, in the following block 204, the temperature is continuously detected in segment 204-1, the pressure is continuously detected in segment 204-2, and the viscosity of the medium is continuously detected in segment 204-3, wherein these parameters are checked for stability within predetermined, i.e., permissible limits, and subsequently a readiness display is performed in a display step 205 when the check of these parameters has been carried out positively. In a following block 206, a selection menu is output having multiple selection windows 206-1 to 206-8, in which, according to 206-1, either a reference is selected or data of further devices can be edited or curve data can be analyzed. In a following block 207, a reference applicable to the flow meter to be tested or calibrated is selected; on the basis of selection windows 207-1, 207-5, 207-9, 207-10, 207-11, a selection is first made among flow meters, which are based on different physical measurement principles, for example, gearwheel flow meters or turbine flow meters, etc.; then, on the basis of selection windows 207-2, 207-3, 207-4, 207-6, 207-7, 207-8, a selection is made among various types, which are secondary to a flow meter operating according to a specific physical measurement principle. In this case, the stored data sets of a plurality of flow references are provided. Thereafter, in the block 208', via a window 208 for selection of the operating mode for the reference set in the block 207, a selection is made among various calibration types on the basis of selection windows 208-1, 208-2, 208-3, 208-4, 208-5, which are explained in detail hereafter.

Figure 6:
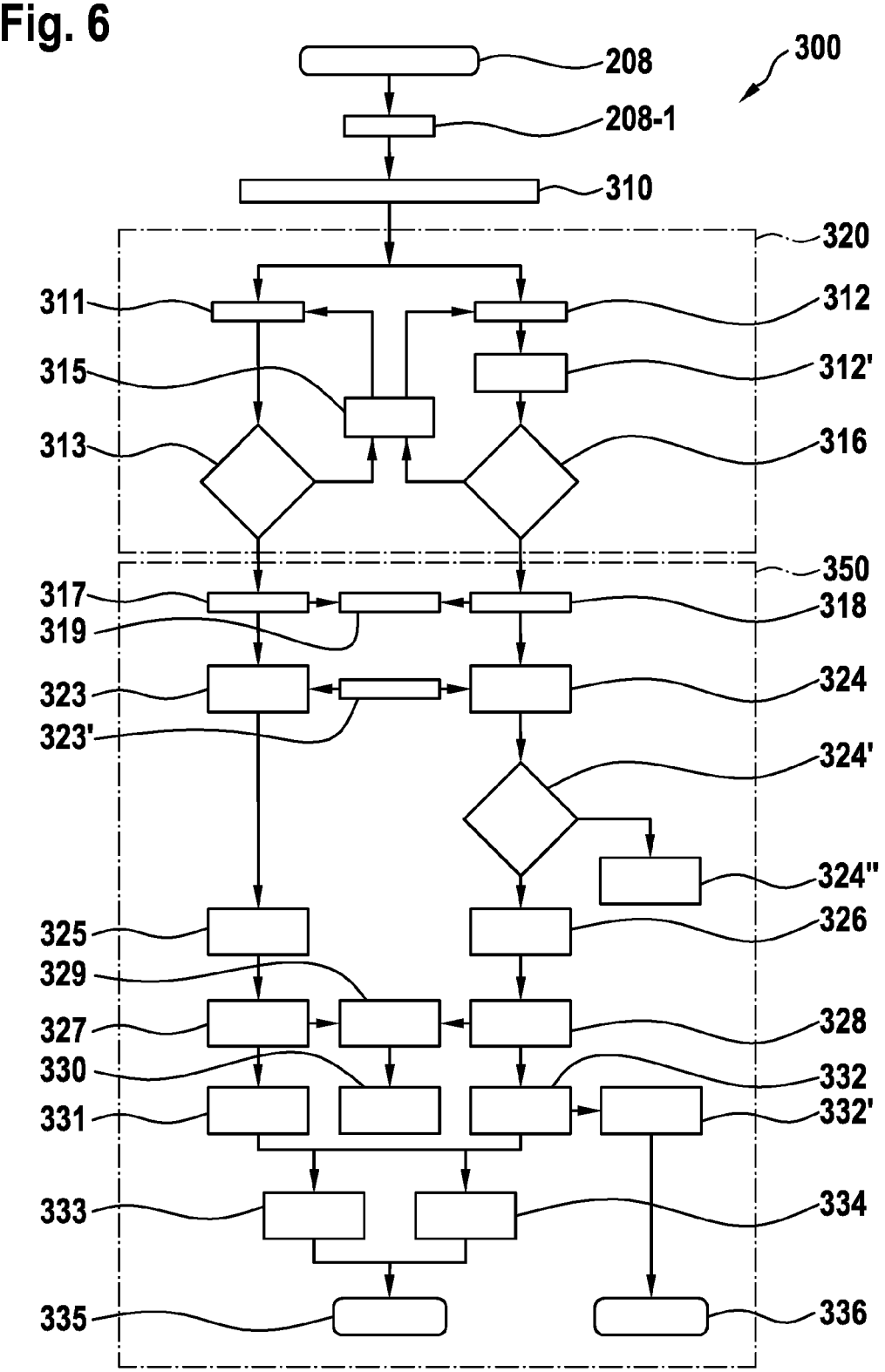
FIG. 6 shows a flow chart having the essential method steps of a subprogram, which can be called by the main program according to FIG. 5, for carrying out a standard procedure.

FIG. 6 shows a flow chart 300, which illustrates the method sequence in a subprogram, when the standard operating mode is set in the block 208' on the basis of the selection window 208-1 of the main program of FIG. 5. In the standard operating mode, flow meters of one type are compared to one another, by comparing a selected master flow meter to a test subject to be calibrated in the reference measurement section. In a step 310, the number of the measured values for the flow measurement used for the calibration is determined. Thereafter, in a block 320, both the reference measurement section and also the test measurement section are stabilized using identical parameters, wherein the physical measured variables pressure, viscosity, temperature, and volume of the medium flowing through are provided as parameters. In this case, within the block 320, on the one hand, these parameters are detected for the reference measurement section in a step 311, while the same parameters are detected for the test measurement section in a step 312, on the other hand. Step 311 is followed by query step 313, in which a query is performed as to whether the detected parameters, i.e., pressure, viscosity, temperature, and volume of the medium, are constant within the reference measurement section. If the result of the query 313 is negative, the reference measurement section is thus filled in step 315, whereupon a jump back to step 311 occurs, while in the event of a positive result of the query 313, a ready message 317 is produced with a transition to the block 350. Step 312 is followed by an intermediate step 312' for filling the test measurement section and then a query step 316, in which a query is performed as to whether the detected parameters, i.e., pressure, viscosity, temperature, and volume of the medium, are constant within the test section. If the result of the query 316 is negative, the reference measurement section is thus filled in step 315, whereupon the sequence jumps back to step 312, while in the event of a positive result of the query 316, a ready message 318 is produced with a transition to the block 350.

If a positive result is provided from both query steps 313 and 316 in the block 310 on the basis of the ready messages 317 and 318, the calibration is thus started within the the block 350 in a step 319, because a stable test state is achieved. After starting the calibration 319, the number of the reference measurement data is determined for the flow to be measured in a step 323 for the reference measurement section and also the number of the test measurement data is determined for the test measurement section in a step 324, for example, 50 measurements each for one measurement cycle, wherein the number of the measurement cycles is defined for both measurement sections in a step 323'. Step 323 is followed by step 325, in which the measurement data for the reference measurement section are detected. In parallel thereto, an intermediate step 324' follows step 324 for the determination of the number of the measurement data in the test measurement section, in which a query is performed as to whether a weighing procedure is carried out for the flow rate flowing through during a measurement cycle and the result of which is to be compared to the reference and test measurement data; if the query 324' is answered in the positive, the flow rate of the medium is thus cyclically weighed in step 324'', while otherwise a jump occurs to step 326, in which the respective measurement data are detected for the test measurement section. If steps 325 and 326, which run in parallel, for detecting the respective measurement data are completed, step 325 is thus followed by a step 327 for analyzing the measurement data detected in the reference measurement section, while similarly thereto, step 326 is followed by a step 328 for analyzing the measurement data detected in the test measurement section. In a joint calculation step 329, the data from both step 327 and also step 328 are brought together and the respective differences are calculated, which are then checked in a following step 330 for predetermined tolerances. In addition, step 327 is followed by a step 331, in which the measurement uncertainty for the measurement data obtained on the reference measurement section is calculated, while in a step 332, which follows step 328, the corresponding measurement uncertainty is calculated for the measurement data obtained on the test measurement section, wherein the calculation is performed on the basis of equation (4a) or (4b), respectively. If the respective calculation in steps 331 and 332 and also in joint test step 330 has the result that the total tolerance was maintained and a predetermined amount of the measurement uncertainty, for example, ⅕, was not exceeded, the calibration is thus completed. The corresponding results from steps 331 and 332 are displayed in a table in a display block 333, on the one hand, and graphically displayed in a display block 334 as a setpoint/actual value comparison, on the other hand. In a following step 335, the data from steps 333, 334 can be output as a log. In addition, in a step 332' following calculation step 332, correction values are ascertained in the measurement data for the test measurement section and then provided in a step 336 for data transfer for other subprogram blocks.

Figure 7:
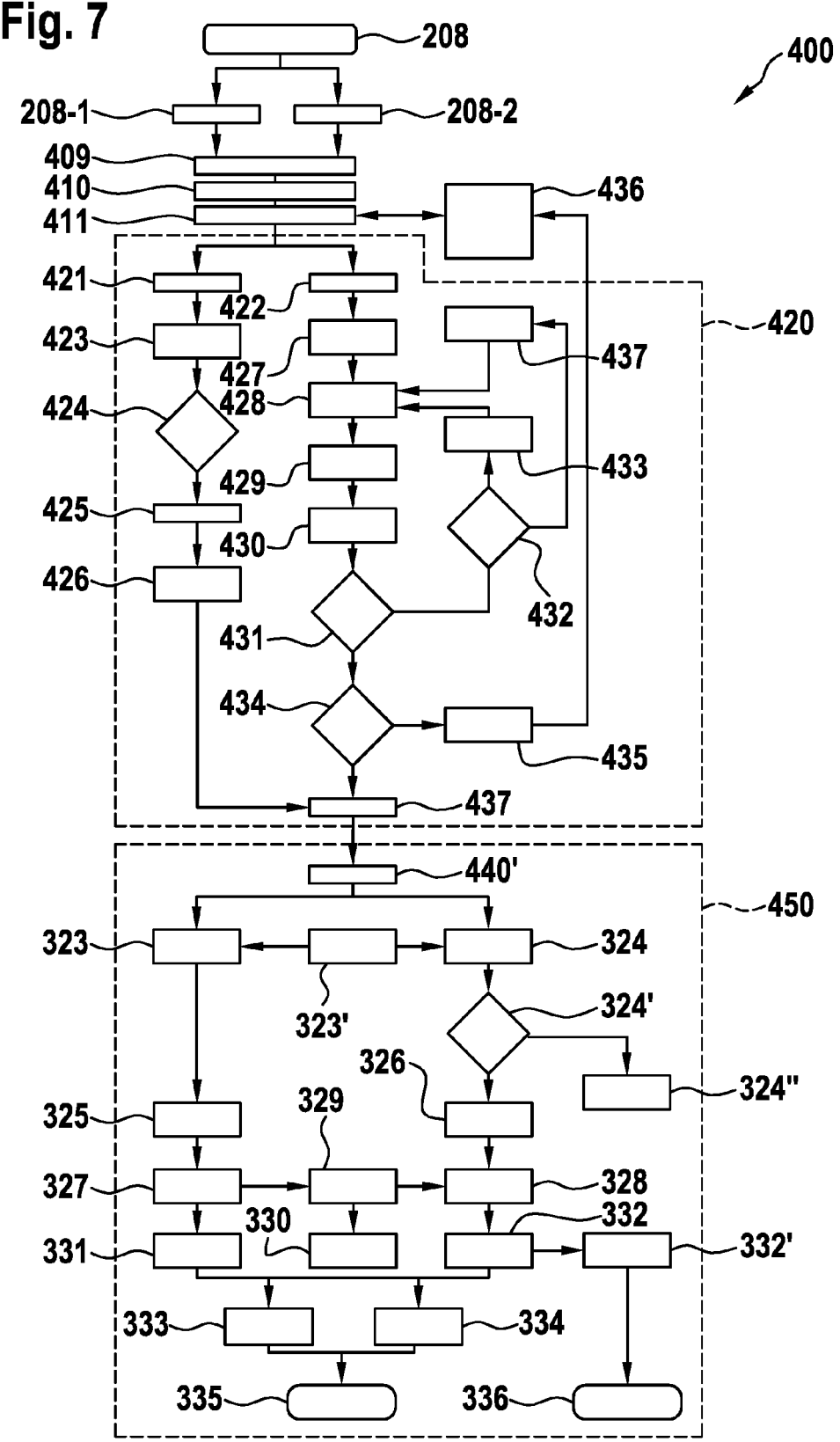
FIG. 7 shows a flow chart having the essential method steps of a subprogram, which can be called by the main program according to FIG. 5, for carrying out an application procedure.

FIG. 7 shows a flow chart 400, which illustrates the method sequence if the application operating mode is set in block 208' of FIG. 5 on the basis of the selection window 208-2. In the application operating mode, a flow meter to be calibrated is calibrated in consideration of ascertained correction factors and under the presumption of an already performed basic calibration. In a step 409, the number of the measured values to be detected is determined. Thereafter, in a step 410, a measurement range is determined, for which a linearization of the measured values to be detected is to be carried out. Subsequently thereto, in a step 411, an application table is applied, in which the correction values to be ascertained are stored. Thereafter, in a block 420, both the reference measurement section and also the test measurement section are stabilized using identical parameters, wherein the physical measured variables pressure, viscosity, temperature, and flow volume of the medium are provided as the parameters. Within the block 420, the reference measurement section is put into measurement readiness in a step 421 and also the test measurement section is put into measurement readiness in a step 422. In a step 423 following step 421, the reference measurement section is activated, i.e., the control unit continuously detects the measurement data transmitted by the respective sensors, whereupon a query is performed in a query step 424 as to whether the detected parameters or measurement data, i.e., pressure, viscosity, temperature, and flow volume of the medium, are constant within the reference measurement section. If the result is positive, a ready message is thus produced in a step 425, because the reference measurement section is in a stable operating state within predetermined tolerance limits. A following step 426 is designed as a waiting loop, until an error message is also produced in a secondary branch of the block 420 for the test measurement section. In the secondary branch, step 422 is followed by an intermediate step 427 for filling the test measurement section and thereafter a step 428 for heating and/or regulating the medium to a predetermined test temperature within the test measurement section. Thereafter, in a step 429, the test pressure is adjusted so that the flow rate at the test subject reaches a stable level, after which, in a step 430, a warm-up of the test subject to the predetermined temperature is performed. After completed warm-up of the test subject, it is checked in a comparison step 431 whether the measured viscosity of the medium corresponds to a predetermined value. If the result of the comparison 431 is negative, in a subsequent comparison step 432, it is thus checked whether the measured viscosity is excessively high in relation to a predetermined value; upon a negative result in step 432, in step 433, the temperature is increased with a jump to step 428 for temperature regulation of the medium. In the event of a positive result in step 432, the measured viscosity of the medium is excessively low in relation to the predetermined value and, in a step 437, the temperature of the medium is reduced with a jump to step 428 for temperature regulation of the medium. However, if the query 431 has the result that the viscosity is within the predefined range, a query is thus carried out in a following step 434 as to whether the detected parameters, i.e., pressure, viscosity, temperature, and flow volume of the medium, are stable and/or constant within the test measurement section. In the event of a negative result, a correction of the tolerances of the parameters is performed in a step 435, whereupon, in a data transfer step 436, these parameters are provided for subsequent transfer to the application table 410. In the event of positive result of the query 434, a ready message 437 is produced, with which the block 420 is completed. Thereafter, a transition occurs into a calibration block 450, in which steps 323 to 336 are carried out similarly to the flow chart 300 of FIG. 6 with the calibration start 440', wherein identical reference signs denote identical or similar method steps as in FIG. 6. In this case, the measurement data are detected and analyzed simultaneously, but separately from one another, in both measurement sections. If the optional weighing procedure is selected for the calibration at high temperature, the flow rate of the medium flowing through the two measurement sections is automatically weighed after a predetermined measurement cycle in each case and compared to the approximately simultaneously ascertained results for the detected flow rate in both measurement sections. The measurement uncertainty of the reference measurement section is compared to that of the test measurement section, wherein it is determined practically simultaneously whether the uncertainty proportion exceeds the permissible limit of ⅕ of the measurement tolerance. The result of the calibration is displayed as a table according to step 333 and displayed as a comparison graphic according to step 334 and can be output as a log in a step 335. In a step 332' following calculation step 332, correction values are ascertained in the measurement data for the test measurement section and a data transfer for other subprogram blocks is then provided in a step 336.

Figure 8:
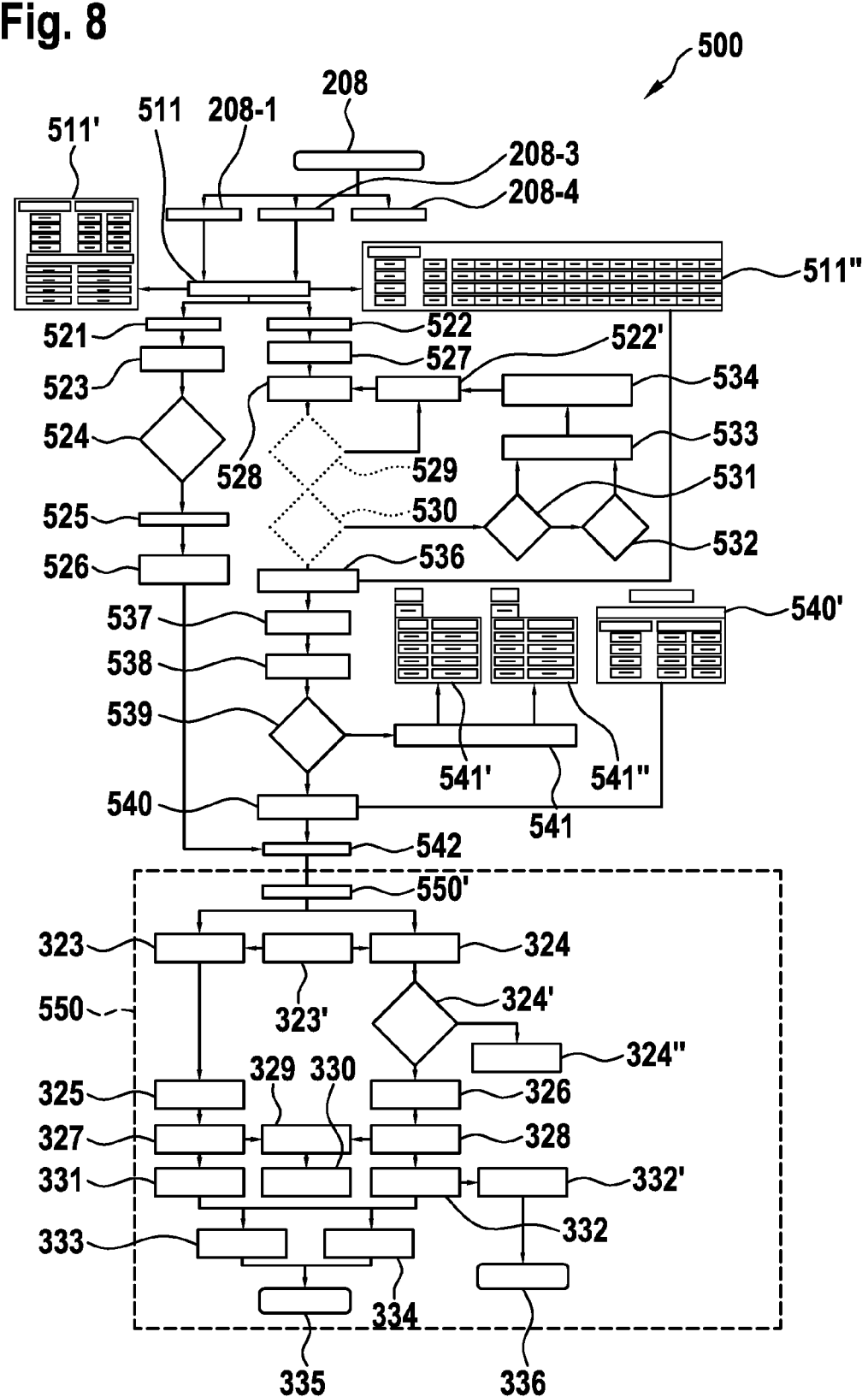
FIG. 8 shows a flow chart having the essential method steps of a subprogram, which can be called by the main program according to FIG. 5, for carrying out a correction procedure.

FIG. 8 shows a flow chart 500, which illustrates the method sequence if the correction operating mode is set in block 208' of the main program of FIG. 5 on the basis of the selection window 208-3, which is used, for example, to recalibrate a flow meter or to calibrate for a measurement range located outside previously ascertained data. In step 511, a parameter table 511 is applied, wherein data sets for the parameter table 511 can be taken, for example, from a producer-specific data table 511' for the test subject or from a databank 511", to calibrate the test subject in a new measurement range or to perform corrections to previous data sets. Thereafter, on the one hand, in step 521, the reference measurement section is put into measurement readiness and, on the other hand, in parallel thereto in step 522, the test measurement section having the test subject to be calibrated is put into measurement readiness. The reference measurement section is activated using the parameters from the parameter table 511 in step 523, i.e., the control unit continuously records measured values detected by the sensors of the reference measurement section; whereupon, according to following step 524, a query is performed as to whether the detected parameters, i.e., pressure, viscosity, temperature, and flow volume of the medium, are constant within the reference measurement section. If the result is positive, in a step 525, a ready message is thus produced, which indicates that the reference measurement section is in a stable operating state within predetermined tolerance limits. Thereafter, a waiting loop 526 occurs, which lasts until a ready message is also provided for the test measurement section. During this, the test measurement section is adjusted to the parameter set of the parameter table 511, wherein after step 522, according to following step 527, the test measurement section is filled and, in step 528, the medium is heated. Thereupon, in subsequent step 529, it is checked whether the predetermined temperature according to the parameter set is reached. In the event of a negative result in step 529, a compensation of the tolerance range is performed in a step 522', with subsequent jump to step 528. If the result of the query in step 529 is positive, it is thus checked in a further query 530 whether the predetermined viscosity according to the parameter set is reached. If the query in step 530 has a negative result, it is thus checked in a subsequent query 531 whether the measured viscosity is excessively high in relation to the predetermined value. If the result of the query 531 is negative, it is thus checked in a further query 532 whether the measured viscosity is excessively low in relation to the predetermined value. If the result of the queries 531 and/or 532 is positive, it is thus ascertained in step 533 whether either an incorrect temperature or an incorrect medium is present; in a subsequent regulation step 534, the temperature is regulated according to the viscosity. After the regulation 534, in step 522', a compensation of the tolerance range follows and subsequently a jump to step 528. In contrast, if the query 530 has a positive result, in a step 536, the detected temperature and the viscosity are thus stored in the parameter table 511". Thereafter, in step 537, the test pressure is regulated, in subsequent step 538, the flow rate is measured, and in following query step 539, it is checked whether this flow rate is within a predetermined tolerance range according to the databank 511' or 511". In the event of a negative result in step 539, the system pressure is reduced or increased step-by-step until the tolerance limit is reached, wherein the respective extreme values are stored in tables 541' or 541", respectively. In the event of a positive result in step 539, the adjusted test or system pressure is stored together with the associated values of the set parameter set in a measurement table 540', which forms the core data of the test subject to be calibrated, for use in the parameter table 541". Thereafter, in step 542, the ready message is produced for the test measurement section. Subsequently thereto, in block 550, the start 550' of the actual calibration procedure occurs, which, with steps 323 to 336, runs substantially identically to block 450 of FIG. 7, wherein identical reference signs denote identical or similar method steps.

Figure 9:
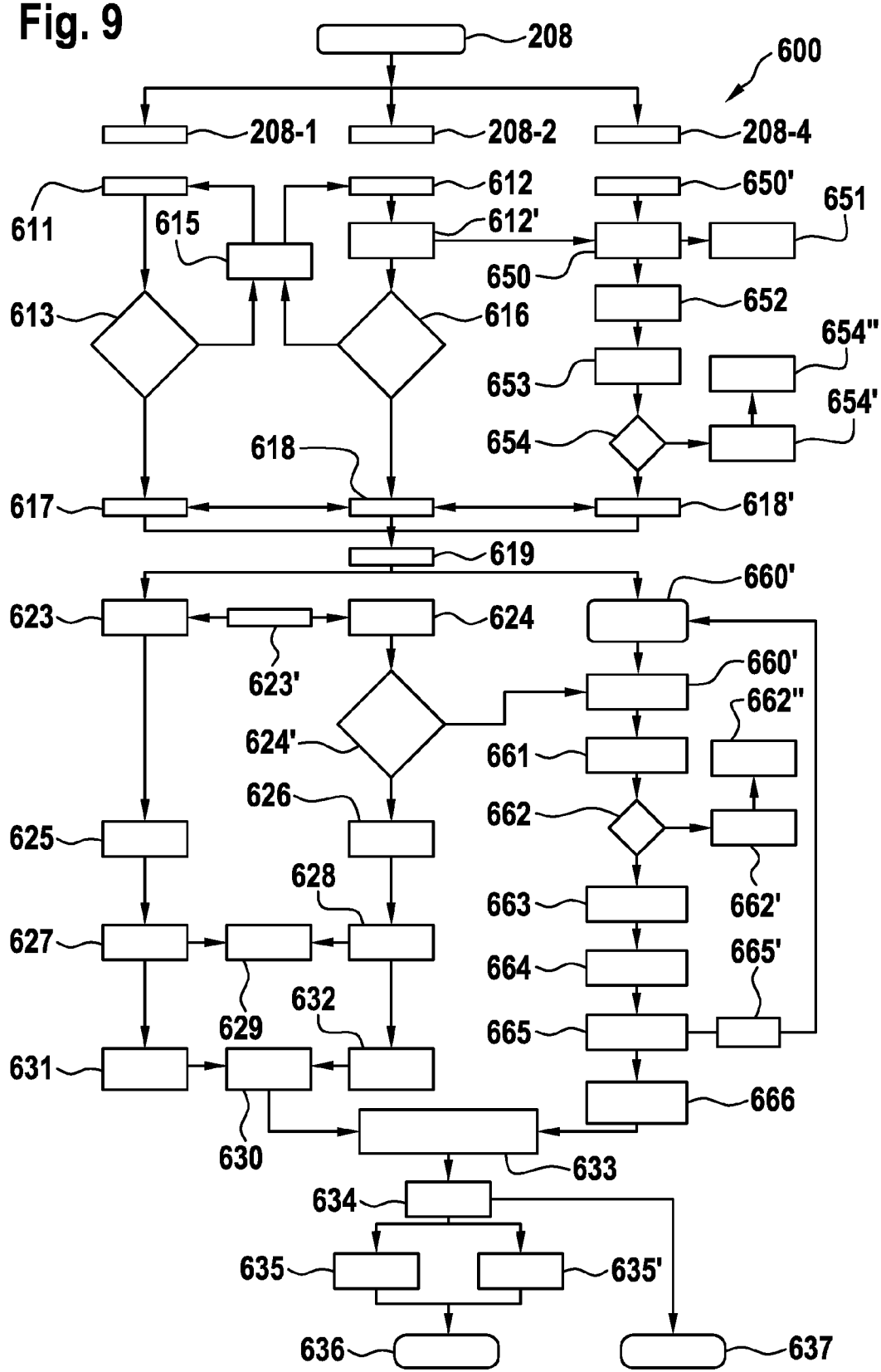
FIG. 9 shows a flow chart having the essential method steps of a subprogram, which can be called by the main program according to FIG. 5, for carrying out a procedure for the mass determination of a flow rate.

FIG. 9 shows a flow chart 600, which illustrates the method sequence if the operating mode for mass determination of the flow rate is set in block 208' of FIG. 5 on the basis of the selection window 208-4. Practically simultaneously, with step 611, the reference measurement section and, in parallel thereto, with step 612, the test measurement section and also, with step 650', the weighing container having weighing cells 142 and fill level meter, are put into measurement readiness. Step 611 is followed by a query step 613, in which a query is performed as to whether the detected parameters, i.e., pressure, viscosity, temperature, and flow volume of the medium, are constant within the reference measurement section. If the result of the query 613 is negative, in step 615, the reference measurement section is thus filled, whereupon a jump back to step 611 occurs, while in the case of a positive result of the query 613, a ready message 617 is produced. For the test measurement section, step 612 is followed by an intermediate step 612' for filling the test measurement section. Following intermediate step 612', a transition to a query step 616 occurs, on the one hand, and a transition to step 650 occurs, on the other hand. In the query step 616, a query is performed as to whether the detected parameters, i.e., pressure, viscosity, temperature, and flow volume of the medium, are constant within the test measurement section. If the result of the query 616 is negative, in step 615, the reference measurement section is thus filled, whereupon a jump back to step 612 occurs, while in the event of a positive result of the query 616, a ready message 618 is produced for the test measurement section. During this, for the weighing container, which has been put into measurement readiness since step 650', a transition occurs to step 650, when the test measurement section is filled with the medium according to step 612', whereupon the partial section leading to the weighing container 140 is released and the weighing container 140 is filled with the medium to subject the weighing container having weighing cells and fill level meter to a function test according to step 651. Thereafter, in a further step 652, the scale and/or the weighing container is emptied, to perform a zero point adjustment according to step 653. In a subsequent query step 654, it is checked whether the scale and/or the weighing container is in a proper functional status. In the event of a negative result, the scale is checked in a step 654' and it is serviced in step 654". In the event of a positive result in step 654, a ready message 618' is produced. If a positive result is provided from each of query steps 613 and 616 and also 654 on the basis of the ready messages 617 and 618 and also 618', the calibration is thus started in a subsequent step 619. After starting 619 the calibration, the number of the reference measurement data is determined in a step 623 for the reference measurement section and also the number of the test measurement data is determined in a step 624 for the test measurement section, for example, 50 measurements each for a measurement cycle. At the same time, the number of the measurement cycles to be carried out is determined for both measurement sections in a joint step 623'. Step 623 is followed by step 625, using which the measurement data for the reference measurement section are detected. In parallel thereto, step 624 for the test measurement section is followed by an intermediate step 624', in which a query is performed as to whether a comparable mass determination is to be carried out by weighing for the flow rate to be measured during the upcoming measurement cycle. If the query 624' is answered in the negative, the data detection for the test measurement section is thus started immediately in step 626. In the event of a positively answered query 624', the weighing procedure for the running measurement cycle is started with step 660 and passes through steps 661 to 666 sequentially. If the respective measurement data detection is ended both in step 625 and also in step 626, on the one hand, an analysis step 627 follows step 625 and, on the other hand, an analysis step 628 follows step 626, in which the corresponding measurement data for the running measurement cycle are analyzed in each case. A data exchange module 629, which corresponds both to analysis step 627 for the reference measurement section and also analysis step 628 for the test measurement section, calculates possibly existing differences from both data sets. If the respective data sets have been analyzed in analysis step 627 and analysis step 628 and the differences have been calculated in step 629, step 627 is thus followed by a calculation step 631, while step 628 is followed by a measurement step 632, in which in each case the measurement uncertainty is calculated for the respective measurement data sets. A data exchange module 630, which corresponds to both step 631 and also step 632, checks tolerances resulting from the comparison of the two measurement uncertainties. After completed checking, in a following step 633, the total measurement uncertainty of the reference measurement section is calculated, by using the result of the weighing procedure according to steps 661 to 666 as a comparison scale, because a more precise measurement is achievable by means of weighing the flow volume than is typically possible using a flow meter. In detail, the weighing procedure in the steps is designed as follows: The start of the weighing procedure begins in step 660 with the initialization by step 624', i.e., when the test measurement section is filled with the medium. Subsequently, the scale or the weighing container is filled according to step 661, whereupon it is checked in a query step 662 whether the temperature of the medium is within a predetermined range. If the temperature is outside the predetermined range, an error is thus detected in step 662' and the cooling of the medium by means of a heat exchanger is initiated, whereupon the scale 140 is emptied in step 662". However, if the temperature is within the predetermined range, the actual weighing procedure thus begins in step 663, whereupon the measurement data obtained by the weighing cells and the fill level meter of the weighing container 140 are detected and analyzed according to step 664. Thereafter, in step 665, the scale or the weighing container is emptied, whereupon a next measurement cycle is generated with step 665' with a jump back to step 660'. The measurement uncertainty is calculated in a calculation step 666 for the measurement cycle which was just carried out. The result is then transferred in computation step 633 and is entered therein into the calculation of the total measurement uncertainty. Thereafter, in a following step 634, the correction values are ascertained in the measured values, which were obtained during the measurement cycle just carried out in the reference and test measurement sections. The result is displayed simultaneously in parallel, on the one hand, as a table in display step 635 and, on the other hand, graphically in display step 635'. In a subsequent logging step 636, the measurement data from steps 635, 635' can be output as a log. In addition, in a step 667 based on calculation step 634, the correction values ascertained in the measurement data for the test section are provided for data transfer to a databank available for all program segments.

The invention claimed is:

1. A method for calibrating flow meters for fluid media having the following steps:
conducting a fluid medium through a reference measurement section (101-1) and a test measurement section (101-2), having a flow meter (125) to be calibrated, wherein the fluid medium is conveyed in a switchable manner out from a storage tank (103) or out from a circulation container (152) as a closed tank, to the reference measurement section (101-1) and the test measurement section (101-2), wherein, for safety reasons, the switching to the circulation container (152) takes place when the measurement sections (101-1, 101-2) are operated at temperatures of approximately 120° C. or greater,
setting at least approximately identical and constant pressure and flow conditions for the fluid medium in both measurement sections (101-1, 101-2),
detecting a reference flow of the fluid medium through the reference measurement section (101-1) and flow values corresponding chronologically thereto, which are measured by the flow meter (125) to be calibrated of the test measurement section (101-2) at a preset media temperature,
comparing the detected reference flow through the reference measurement section (101-1) to the flow values corresponding chronologically thereto of the flow meter (125) to be calibrated, to ascertain at least one correction value for calibration of the flow meter (125) at the preset media temperature based thereon, and
determining respective correction values for the flow meter (125) for different media temperatures of the fluid medium, to ascertain a calibration function on the basis of the correction values.

2. The method as claimed in claim 1, characterized in that the fluid medium is heated to the preset media temperature before the fluid medium enters the test measurement section (101-2), wherein the preset media temperature is kept constant during a running measurement series within the test measurement section (101-2).

3. The method as claimed in claim 1, characterized in that the fluid medium is heated to the preset media temperature before the fluid medium enters the reference measurement section (101-1), wherein the preset media temperature is kept constant during a running measurement series within the reference measurement section (101-1) and the test measurement section (101-2).

4. The method as claimed in claim 1, characterized in that, to detect a total flow rate, a volume of the fluid medium which passes through the reference measurement section (101-1) and the test measurement section (101-2) during a measurement procedure is determined by weighing.

5. The method as claimed in claim 1, characterized in that a correction value $k_T$ for a predetermined media temperature T at a predefined viscosity of the fluid medium is ascertained on the basis of the following equation:

$$k_T = Q_{setpoint} - Q,$$

wherein $Q_{setpoint}$ denotes a setpoint flow rate and Q denotes a mean value of multiple flow rate measured values detected in chronological succession by means of the flow meter (125) to be calibrated.

6. The method as claimed in claim 1, characterized in that a correction value $k_T$ is ascertained for a predetermined media temperature T on the basis of the following equation:

$$k_T = Q_{setpoint} - Q_{master} - Q_{weighed} + Q_{cal},$$

wherein $Q_{setpoint}$ denotes a flow volume to be measured, $Q_{master}$ denotes a respective mean value of a flow volume ascertained in the reference measurement section (101-1), $Q_{weighed}$ denotes a respective mean value of a flow volume measured by weighing, $Q_{cal}$ denotes a mean flow volume in the test measurement section (101-2), and $k_T$ denotes the correction value during a flow of a predetermined flow volume.

7. The method as claimed in claim 6, characterized in that a measurement uncertainty for the flow meter (125) to be calibrated can be ascertained with reference to the following equation on the basis of the ascertained correction value $k_T$:

$$\pm u = 0.5 * \sqrt{k_T^2 + \sum_{j=1}^{l} c_j^2}$$

wherein ±u denotes the measurement uncertainty and $k_T$ denotes the correction value at the predetermined media temperature T, while systematic measurement deviations of different origins are denoted by variables $c_j$, wherein j denotes a running index of the variables and l denotes a number of the variables to be considered.

8. A calibration device, in particular for carrying out a method, wherein the calibration device has a reference measurement section (101-1) and a test measurement section (101-2) for a flow meter (125) to be calibrated, having means (112, 131) for setting at least approximately identical and constant pressure and flow conditions for a fluid medium in both measurement sections, having means (115, 116, 125) for detecting a reference flow of the fluid medium through the reference measurement section (101-1) and flow values corresponding chronologically thereto through the test measurement section (101-2) at a preset media temperature, having means (195, 198) for comparing the detected reference flow through the reference measurement section (101-1) to the flow values corresponding chronologically thereto of the flow meter (125) to be calibrated, to ascertain at least one correction value based thereon for calibration of the flow meter (125) at the preset media temperature, having means (195, 198) for determining respective correction values for the flow meter (125) for different media temperatures of the fluid medium, to ascertain a calibration function on the basis of the correction values, and having means (104, 155) for the switchable conveyance of the fluid medium (102) from a storage tank (103) or from a circulation container (152), which is designed as a closed tank, to the reference measurement section (101-1) and the test measurement section (101-2), wherein, for safety reasons, the switching to the circulation container (152) takes place when the measurement sections (101-1, 101-2) are operated at temperatures of approximately 120° C. or greater.

9. The calibration device as claimed in claim 8, characterized in that the test measurement section (101-2) is downstream of the reference measurement section (101-1) in a flow direction of the fluid medium (102).

10. The calibration device as claimed in claim 8, characterized in that means (118, 118') for heating the fluid medium (102) are arranged in a flow direction between the reference measurement section (101-1) and the test measurement section (101-2).

11. The calibration device as claimed in claim 10, characterized in that the means (118, 118') for heating the fluid medium have at least one heat exchanger (118) and an associated temperature control device (118').

12. The calibration device as claimed in claim 8, characterized in that means (109-2, 109-4, 132, 134, 135, 140-143) for weighing a flow rate which flows through the reference measurement section (101-1) and the test measurement section (101-2) during a measurement series are downstream of the test measurement section (101-2) in a flow direction of the fluid medium.

13. The calibration device as claimed in claim 12, characterized in that the means for weighing comprise a weighing container (140) for accommodating the fluid medium (102) exiting from the test measurement section (101-2), wherein the weighing container (140) can be fluidically coupled via at least one line (101, 109-2, 109-4) to an outlet of the test measurement section (101-2) and the weighing container (140) has at least one weighing measurement cell (142), which is used for weighing the fluid medium accommodated in the weighing container (140).

14. The calibration device as claimed in claim 12, characterized in that at least one switching valve (135) is provided, which is downstream of an outlet of the test measurement section (101-2) on an outflow side, to conduct the fluid medium exiting from the test measurement section (101-2) into a weighing container (140) in a first valve switch position and to return the fluid medium (102) into the storage tank (103) in a second valve switch position.

15. The calibration device as claimed in claim 8, characterized in that, for exchange and/or replacement of the flow meter (125), at least one switching valve (119) is arranged between the reference measurement section (101-1) and the test measurement section (101-2), which fluidically connects the reference measurement section (101-1) to the test measurement section (101-2) in a first valve switch position and fluidically disconnects the test measurement section (101-2) from the reference measurement section (101-1) in a second valve switch position.

16. The calibration device as claimed in claim 8, characterized in that sensors (110, 111, 113, 117; 119'; 120, 121, 123, 127) are arranged in the reference measurement section (101-1) and in the test measurement section (101-2) to detect physical measured variables of the fluid medium (102) at least on the basis of pressure, temperature, and viscosity.

17. The calibration device as claimed in claim 8, characterized in that the storage tank (103) for accommodating the fluid medium (102) and at least one pump (104) are provided, wherein the at least one pump (104) conveys the fluid medium (102) during the calibration operation through the reference measurement section (101-1) and the test measurement section (101-2), which is downstream in a flow direction.

18. The calibration device as claimed in claim 8, characterized in that at least one flow rectifier (112, 122) is provided both in the reference measurement section (101-1) and al-se in the test measurement section (101-2).

19. The calibration device as claimed in claim 8, characterized in that at least two flow meters (115, 116) are arranged in succession in a flow direction in the reference measurement section (101-1).

20. The calibration device as claimed in claim 8, characterized in that the reference measurement section (101-1) has an operating piston (165), which is accommodated so the operating piston is displaceable in a cylinder (166), and which is used to generate a constant, uniform volume stream of the fluid medium (102) in the reference measurement section (101-1) during execution of an operating stroke.

21. The calibration device as claimed in claim 8, characterized in that the reference measurement section (101-2) is designed as a mobile module (197), which is provided with a calibration on the basis of at least one calibration data set (193, 194, 199), wherein the at least one calibration data set (193, 194, 199) provides at least one correction value for a reference function of the mobile module (197).

* * * * *